United States Patent
Makino et al.

(10) Patent No.: US 12,073,652 B2
(45) Date of Patent: Aug. 27, 2024

(54) IMAGE DATA PROCESSING DEVICE AND IMAGE DATA PROCESSING SYSTEM

(71) Applicant: FUJIFILM Corporation, Tokyo (JP)

(72) Inventors: Kenji Makino, Saitama (JP); Masahiro Terada, Saitama (JP); Daisuke Hayashi, Saitama (JP); Shunta Ego, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 126 days.

(21) Appl. No.: 18/048,433

(22) Filed: Oct. 20, 2022

(65) Prior Publication Data

US 2023/0054531 A1 Feb. 23, 2023

Related U.S. Application Data

(63) Continuation of application No. PCT/JP2021/018436, filed on May 14, 2021.

(30) Foreign Application Priority Data

May 22, 2020 (JP) ................................ 2020-089729

(51) Int. Cl.
*G06V 40/16* (2022.01)
*G06T 7/70* (2017.01)
(Continued)

(52) U.S. Cl.
CPC .............. *G06V 40/161* (2022.01); *G06T 7/70* (2017.01); *G06V 10/776* (2022.01); *H04N 23/90* (2023.01);
(Continued)

(58) Field of Classification Search
CPC .. G06V 40/161; G06V 40/174; G06V 10/776; H04N 23/90; H04N 23/695; G06T 2207/10144; G06T 2207/30201
See application file for complete search history.

(56) References Cited

U.S. PATENT DOCUMENTS

| 2006/0056667 | A1* | 3/2006 | Waters | G06T 7/70 |
| | | | | 382/118 |
| 2012/0032795 | A1* | 2/2012 | Ishii | H04N 23/64 |
| | | | | 340/539.1 |

(Continued)

FOREIGN PATENT DOCUMENTS

| JP | 2015125731 | 7/2015 |
| JP | 2016057701 | 4/2016 |

(Continued)

OTHER PUBLICATIONS

"International Search Report (Form PCT/ISA/210) of PCT/JP2021/018436," mailed on Aug. 10, 2021, with English translation thereof, pp. 1-5.

(Continued)

*Primary Examiner* — Timothy R Newlin
(74) *Attorney, Agent, or Firm* — JCIPRNET

(57) ABSTRACT

An image data processing device and an image data processing system are provided. An image data processing device performs a process of inputting a plurality of image data items in which imaging ranges at least partially overlap, detecting a face of a person in an image indicated by the image data, and recognizing a personal attribute of the person on the basis of the detected face for each of the image data items, a process of generating map data, in which the recognized personal attribute has been recorded in association with a position of the person in the image indicated by the image data, for each of the image data items, a process of interpolating the personal attribute of the person who overlaps between a plurality of the map data items, and a process of combining the plurality of map data items after the interpolation to generate composite map data.

21 Claims, 16 Drawing Sheets

(51) Int. Cl.
  *G06V 10/776* (2022.01)
  *H04N 23/90* (2023.01)
(52) U.S. Cl.
  CPC .............. *G06T 2207/10144* (2013.01); *G06T 2207/30201* (2013.01)

(56) References Cited

U.S. PATENT DOCUMENTS

| | | | | |
|---|---|---|---|---|
| 2013/0129226 | A1* | 5/2013 | Abe | H04N 23/675 |
| | | | | 382/199 |
| 2016/0070987 | A1 | 3/2016 | Irie et al. | |
| 2016/0140399 | A1* | 5/2016 | Yano | G06T 7/521 |
| | | | | 382/103 |
| 2017/0308919 | A1* | 10/2017 | Karuvath | G06V 10/95 |
| 2019/0026538 | A1* | 1/2019 | Wang | G06V 40/172 |
| 2019/0108390 | A1* | 4/2019 | Ishikawa | G06F 3/015 |
| 2019/0122071 | A1* | 4/2019 | Jin | G06N 20/00 |
| 2019/0392550 | A1* | 12/2019 | Uchiyama | G06T 7/70 |
| 2020/0355945 | A1* | 11/2020 | Abdo Sarquis Attié | |
| | | | | H04N 23/64 |
| 2020/0394395 | A1* | 12/2020 | Ong | G06V 40/161 |
| 2021/0133435 | A1* | 5/2021 | Yoshinaga | G08B 25/00 |
| 2022/0189210 | A1* | 6/2022 | El Youssoufi | G06V 20/58 |

FOREIGN PATENT DOCUMENTS

| | | |
|---|---|---|
| JP | 2016100033 | 5/2016 |
| JP | 2016147011 | 8/2016 |
| JP | 2017182681 | 10/2017 |
| JP | 2019197353 | 11/2019 |
| WO | 2016035632 | 3/2016 |

OTHER PUBLICATIONS

"Written Opinion of the International Searching Authority (Form PCT/ISA/237)" of PCT/JP2021/018436, mailed on Aug. 10, 2021, with English translation thereof, pp. 1-8.

* cited by examiner

FIG. 2
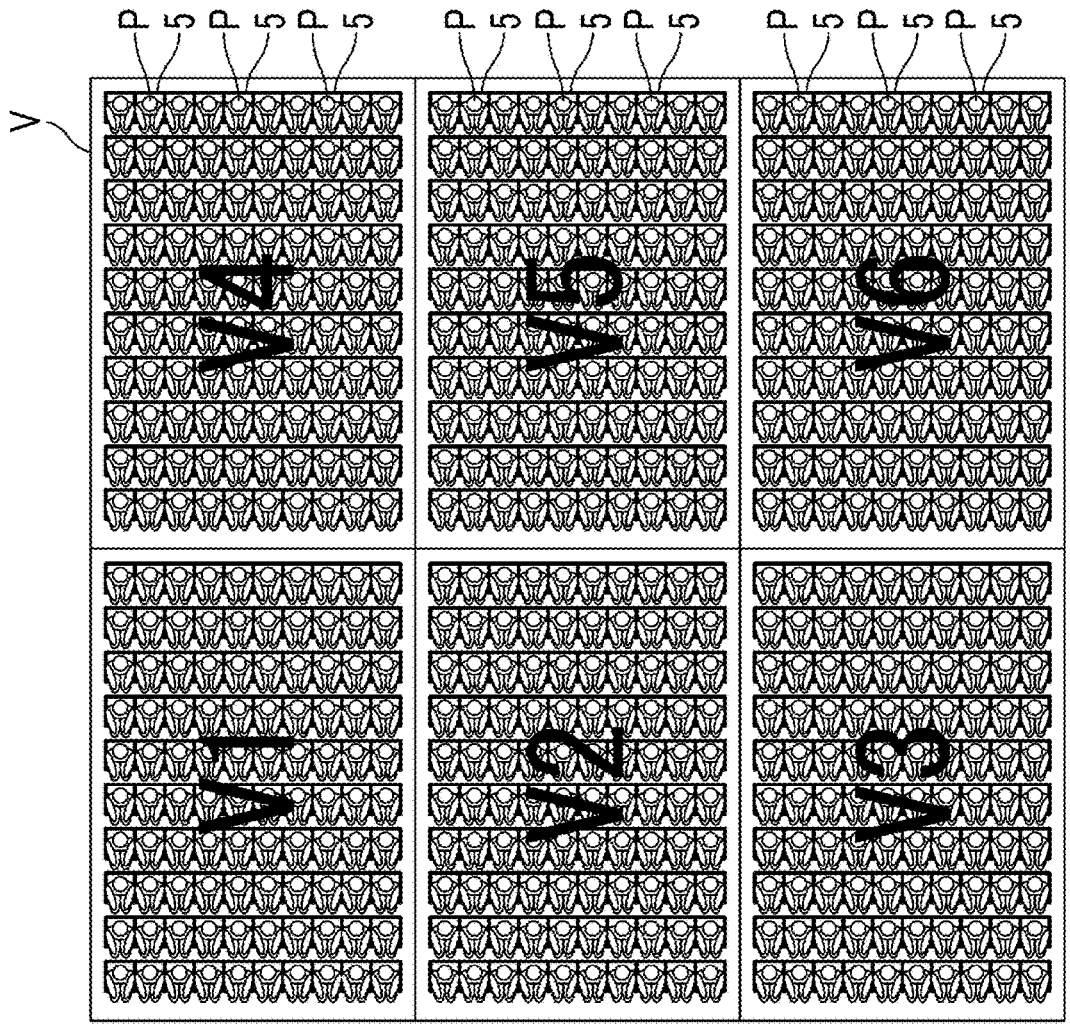
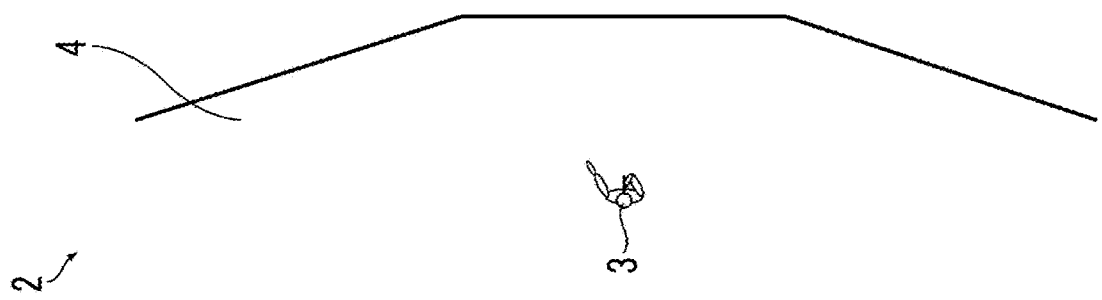

FIG. 10

| | COORDINATE POSITION (x, y) | PERSONAL ATTRIBUTES | | | | | | | | |
|---|---|---|---|---|---|---|---|---|---|---|
| | | AGE | GENDER | EMOTION | | | | | | |
| | | | | STRAIGHT FACE | JOY | ANGER | DISGUST | SURPRISE | FEAR | SADNESS |
| 1 | (100, 100) | TWENTIES | FEMALE | 12 | 75 | 0 | 0 | 10 | 3 | 0 |
| 2 | (200, 100) | TWENTIES | MALE | 21 | 65 | 0 | 0 | 9 | 1 | 4 |
| 3 | (300, 100) | TWENTIES | MALE | 10 | 81 | 0 | 0 | 9 | 0 | 0 |
| 4 | (400, 100) | THIRTIES | FEMALE | 11 | 73 | 0 | 0 | 10 | 6 | 0 |
| 5 | (500, 100) | THIRTIES | FEMALE | 27 | 71 | 0 | 1 | 1 | 0 | 0 |
| ... | ... | ... | ... | ... | ... | ... | ... | ... | ... | ... |
| n | (i, j) | xxx | xxx | xxx | xxx | xxx | xxx | xxx | xxx | xxx |

FIG. 11

| AREA | CAMERA | MAP DATA | | | | MAP DATA AFTER INTERPOLATION | | | | COMPOSITE MAP DATA | | | | PROCESSED DATA | | | | HEAT MAP | | |
|---|---|---|---|---|---|---|---|---|---|---|---|---|---|---|---|---|---|---|---|---|
| | | 1 | 2 | ... | n | 1 | 2 | ... | n | 1 | 2 | ... | n | 1 | 2 | ... | n | 1 | 2 | ... | n |
| V1 | C1 | V1-C1-1 | V1-C1-2 | ... | V1-C1-n | V1-C1-1i | V1-C1-2i | ... | V1-C1-ni | | | | | | | | | | | |
| | C2 | V1-C2-1 | V1-C2-2 | ... | V1-C2-n | V1-C2-1i | V1-C2-2i | ... | V1-C2-ni | | | | | | | | | | | |
| | C3 | V1-C3-1 | V1-C3-2 | ... | V1-C3-n | V1-C3-1i | V1-C3-2i | ... | V1-C3-ni | | | | | | | | | | | |
| | C4 | V1-C4-1 | V1-C4-2 | ... | V1-C4-n | V1-C4-1i | V1-C4-2i | ... | V1-C4-ni | | | | | | | | | | | |
| | C5 | V1-C5-1 | V1-C5-2 | ... | V1-C5-n | V1-C5-1i | V1-C5-2i | ... | V1-C5-ni | | | | | | | | | | | |
| | C6 | V1-C6-1 | V1-C6-2 | ... | V1-C6-n | V1-C6-1i | V1-C6-2i | ... | V1-C6-ni | MD1 | MD2 | ... | MDn | AD1 | AD2 | ... | ADn | HM1 | HM2 | ... | HMn |
| V2 | C1 | V2-C1-1 | V2-C1-2 | ... | V2-C1-n | V2-C1-1i | V2-C1-2i | ... | V2-C1-ni | | | | | | | | | | | |
| | C2 | V2-C2-1 | V2-C2-2 | ... | V2-C2-n | V2-C2-1i | V2-C2-2i | ... | V2-C2-ni | | | | | | | | | | | |
| | C3 | V2-C3-1 | V2-C3-2 | ... | V2-C3-n | V2-C3-1i | V2-C3-2i | ... | V2-C3-ni | | | | | | | | | | | |
| | C4 | V2-C4-1 | V2-C4-2 | ... | V2-C4-n | V2-C4-1i | V2-C4-2i | ... | V2-C4-ni | | | | | | | | | | | |
| | C5 | V2-C5-1 | V2-C5-2 | ... | V2-C5-n | V2-C5-1i | V2-C5-2i | ... | V2-C5-ni | | | | | | | | | | | |
| | C6 | V2-C6-1 | V2-C6-2 | ... | V2-C6-n | V2-C6-1i | V2-C6-2i | ... | V2-C6-ni | | | | | | | | | | | |
| ... | ... | ... | ... | ... | ... | ... | ... | ... | ... | | | | | | | | | | | |
| V6 | C1 | V6-C1-1 | V6-C1-2 | ... | V6-C1-n | V6-C1-1i | V6-C1-2i | ... | V6-C1-ni | | | | | | | | | | | |
| | C2 | V6-C2-1 | V6-C2-2 | ... | V6-C2-n | V6-C2-1i | V6-C2-2i | ... | V6-C2-ni | | | | | | | | | | | |
| | C3 | V6-C3-1 | V6-C3-2 | ... | V6-C3-n | V6-C3-1i | V6-C3-2i | ... | V6-C3-ni | | | | | | | | | | | |
| | C4 | V6-C4-1 | V6-C4-2 | ... | V6-C4-n | V6-C4-1i | V6-C4-2i | ... | V6-C4-ni | | | | | | | | | | | |
| | C5 | V6-C5-1 | V6-C5-2 | ... | V6-C5-n | V6-C5-1i | V6-C5-2i | ... | V6-C5-ni | | | | | | | | | | | |
| | C6 | V6-C6-1 | V6-C6-2 | ... | V6-C6-n | V6-C6-1i | V6-C6-2i | ... | V6-C6-ni | | | | | | | | | | | |

FIG. 15

| DEGREE OF EXCITEMENT | 1-10 | 11-20 | 21-30 | 31-40 | 41-50 | 51-60 | 61-70 | 71-80 | 81-90 | 91-100 |
|---|---|---|---|---|---|---|---|---|---|---|
| DISPLAY | ● | ● | ● | ● | ● | ● | ● | ● | ● | ● |

IMAGE DATA PROCESSING DEVICE AND IMAGE DATA PROCESSING SYSTEM

CROSS-REFERENCE TO RELATED APPLICATIONS

The present application is a Continuation of PCT International Application No. PCT/JP2021/018436 filed on May 14, 2021 claiming priority under 35 U.S.C § 119(a) to Japanese Patent Application No. 2020-089729 filed on May 22, 2020. Each of the above applications is hereby expressly incorporated by reference, in its entirety, into the present application.

BACKGROUND OF THE INVENTION

1. Field of the Invention

The present invention relates to an image data processing device and an image data processing system, and more particularly, to an image data processing device and an image data processing system that process image data obtained from a plurality of imaging devices.

2. Description of the Related Art

JP2016-147011A discloses a technique that images an area in which a plurality of audiences are present, acquires information, such as facial expressions of each audience, with image recognition, and records the acquired information in association with information of the position of each audience.

JP2017-182681A discloses a technique that visualizes information obtained by analyzing image data, using color coding and the like, superimposes the information on image data three-dimensionally expressed, and displays the image data.

SUMMARY OF THE INVENTION

One embodiment according to the technology of the present disclosure provides an image data processing device and an image data processing system that can acquire information of a personal attribute of a person in a specific area with high accuracy.

(1) There is provided an image data processing device that processes image data items which are obtained from a plurality of imaging devices and in which imaging ranges at least partially overlap. The image data processing device comprises a processor. The processor performs: a process of detecting a face of a person in an image indicated by the image data and recognizing a personal attribute of the person on the basis of the detected face for each of the image data items; a process of generating map data, in which the recognized personal attribute has been recorded in association with a position of the person in the image indicated by the image data, for each of the image data items; a process of interpolating the personal attribute of the person who overlaps between a plurality of the map data items; and a process of combining the plurality of map data items after the interpolation to generate composite map data.

(2) In the image data processing device according to (1), the processor may further perform a process of generating a heat map from the composite map data.

(3) In the image data processing device according to (2), the processor may further perform a process of displaying the generated heat map on a display.

(4) In the image data processing device according to (2) or (3), the processor may further perform a process of outputting the generated heat map to an outside.

(5) In the image data processing device according to any one of (1) to (4), the processor may collate the personal attributes of the person who overlaps between the plurality of map data items and interpolate the personal attribute of the person lost in one map data item with the personal attribute of the person in another map data item.

(6) In the image data processing device according to any one of (1) to (5), the processor may also calculate a recognition accuracy in a case in which the personal attribute of the person is recognized.

(7) In the image data processing device according to (6), the processor may replace the personal attribute of the person with relatively low recognition accuracy with the personal attribute of the person with relatively high recognition accuracy to interpolate the personal attribute of the overlapping person.

(8) In the image data processing device according to (6), the processor may give a weight corresponding to the recognition accuracy, calculate an average of the personal attributes of each of the persons, and replace the personal attribute with the calculated average to interpolate the personal attribute of the overlapping person.

(9) In the image data processing device according to any one of (6) to (8), the processor may have a plurality of recognition accuracies, adopt information of the personal attribute of the person having a recognition accuracy equal to or greater than a first threshold value, and interpolate the personal attribute of the overlapping person.

(10) In the image data processing device according to any one of (6) to (9), the processor may further perform a process of excluding information of the personal attribute having a recognition accuracy equal to or less than a second threshold value in the map data after interpolation.

(11) In the image data processing device according to any one of (1) to (9), in a case in which information of the personal attribute is not capable of being interpolated with another map data item, the processor may interpolate the information with another information item of the personal attribute having a similar change in attribute information over time.

(12) In the image data processing device according to any one of (1) to (11), the processor may further perform a process of specifying the person who overlaps between the plurality of map data items.

(13) In the image data processing device according to (12), the processor may specify the person who overlaps between the plurality of map data items on the basis of a disposition relationship of the person in the map data.

(14) In the image data processing device according to (12), the processor may specify the person who overlaps between the plurality of map data items on the basis of the personal attribute of the person at each position in the map data.

(15) In the image data processing device according to any one of (1) to (14), the processor may recognize at least one of gender, age, or emotion as the personal attribute on the basis of the face of the person.

(16) In the image data processing device according to any one of (1) to (15), the processor may instruct the plurality of imaging devices to image an area, in which the imaging ranges overlap each other, under different conditions.

(17) In the image data processing device according to (16), the processor may instruct the plurality of imaging devices to image the area, in which the imaging ranges overlap each other, in different directions.

(18) In the image data processing device according to (16) or (17), the processor may instruct the plurality of imaging devices to image the area, in which the imaging ranges overlap each other, with different exposures.

(19) There is provided an image data processing system comprising: a plurality of imaging devices whose imaging ranges at least partially overlap; and an image data processing device that processes image data items obtained from the plurality of imaging devices. The image data processing device includes a processor. The processor performs: a process of detecting a face of a person in an image indicated by the image data and recognizing a personal attribute of the person on the basis of the detected face for each of the image data items; a process of generating map data, in which the recognized personal attribute has been recorded in association with a position of the person in the image indicated by the image data, for each of the image data items; a process of interpolating the personal attribute of the person who overlaps between a plurality of the map data items; and a process of combining the plurality of map data items after the interpolation to generate composite map data.

(20) In the image data processing system according to (19), the plurality of imaging devices may image an area, in which imaging ranges overlap each other, under different conditions.

(21) In the image data processing system according to (20), the plurality of imaging devices may image the area, in which the imaging ranges overlap each other, in different directions.

(22) In the image data processing system according to (20) or (21), the plurality of imaging devices may image the area, in which the imaging ranges overlap each other, with different exposures.

BRIEF DESCRIPTION OF THE DRAWINGS

FIG. 2 is a diagram illustrating an example of division of a viewing area.

FIG. 10 is a diagram illustrating an example of the map data.

FIG. 11 is a diagram illustrating an example of a database.

FIG. 15 is a diagram illustrating an example of a display aspect of the degree of excitement.

DESCRIPTION OF THE PREFERRED EMBODIMENTS

Hereinafter, preferred embodiments of the invention will be described in detail with reference to the accompanying drawings.

In events, such as concerts and sports, for example, emotional information of all of audiences in a venue is measured and collected throughout the duration of the event, which makes it possible to analyze various types of information. For example, at a concert or the like, it is possible to analyze the degree of excitement of the audiences for each song on the basis of the collected emotional information of all of the audiences. In addition, the emotional information of each audience is recorded in association with the positional information of each audience, which makes it possible to analyze, for example, the distribution of excitement in the venue. Furthermore, the center of the distribution of the excitement is specified, which makes it possible to specify the audience or the like who is the life of the party.

For example, an image recognition technique can be used to measure the emotional information of each audience or the like. That is, for example, the emotion of each audience is estimated from a captured image of each audience by image recognition. The main method is the analysis of facial expressions detected from the image.

However, it is difficult to measure, for example, the emotional information of all of the audiences in the venue using image recognition without omission. The reason is that, for example, a case is assumed in which the face of an audience is hidden by obstacles (for example, cheering flags, another audience crossing in front of the audience, the hands of the audience or the hands of another audience next to the audience, food and drink, a camera, and the like), the audience turns the face, or flares and/or ghosts (sunlight, reflection, flash, and the like) occur in the image, which makes it difficult to detect the face.

This embodiment provides a system that can accurately measure the emotional information of all of the audiences or the like in the venue throughout the duration of the event without omission in a case in which the emotional information of the audiences or the like is measured by image recognition.

[System Configuration]

Here, a case in which the emotional information of all of the audiences or the like in an event venue, such as a concert, is measured and collected will be described as an example.

Figure 1:
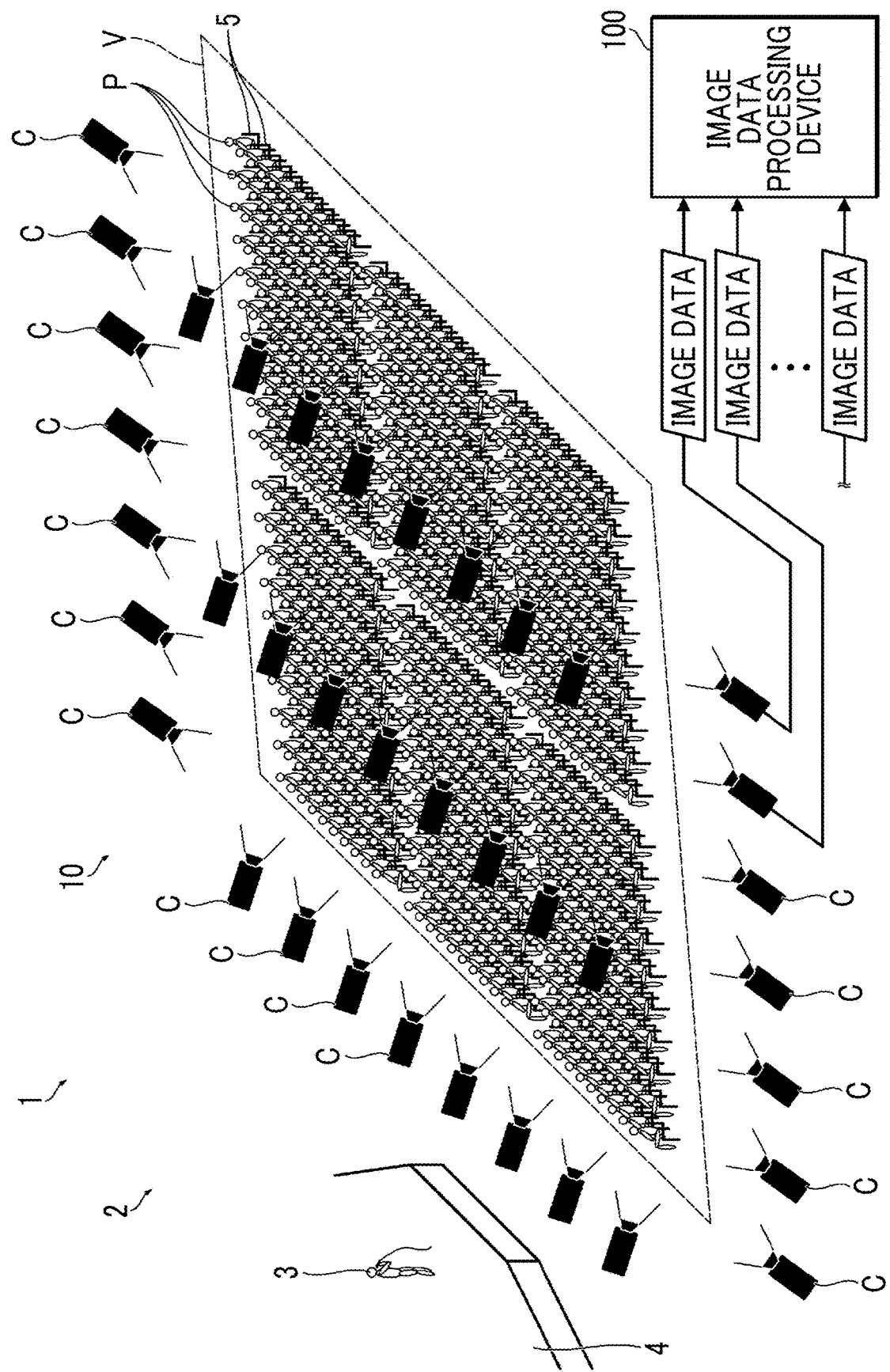
FIG. 1 is a diagram illustrating a schematic configuration of an image data processing system.

FIG. 1 is a diagram illustrating a schematic configuration of an image data processing system according to this embodiment.

As illustrated in FIG. 1, an image data processing system 1 according to this embodiment comprises an audience imaging device 10 that images all of audiences in an event venue and an image data processing device 100 that processes image data captured by the audience imaging device 10.

An event venue 2 has a stage 4 on which a performer 3 puts on a show and a viewing area V in which audiences P watch the show. In the viewing area V, seats 5 are regularly disposed. The audiences P sit on the seats 5 and watch the show. The positions of the seats 5 are fixed.

[Audience Imaging Device]

The audience imaging device 10 is composed of a plurality of cameras C. The camera C is a digital camera having a moving image capture function. The camera C is an example of an imaging device. The audience P is an example of a person imaged by the imaging device.

The audience imaging device 10 divides the viewing area V into a plurality of areas and images each area with the plurality of cameras C in multiple directions.

FIG. 2 is a diagram illustrating an example of the division of the viewing area. As illustrated in FIG. 2, in this example, the viewing area V is divided into six areas V1 to V6. Each of the areas V1 to V6 is individually imaged in multiple directions by a plurality of cameras.

Figure 3:
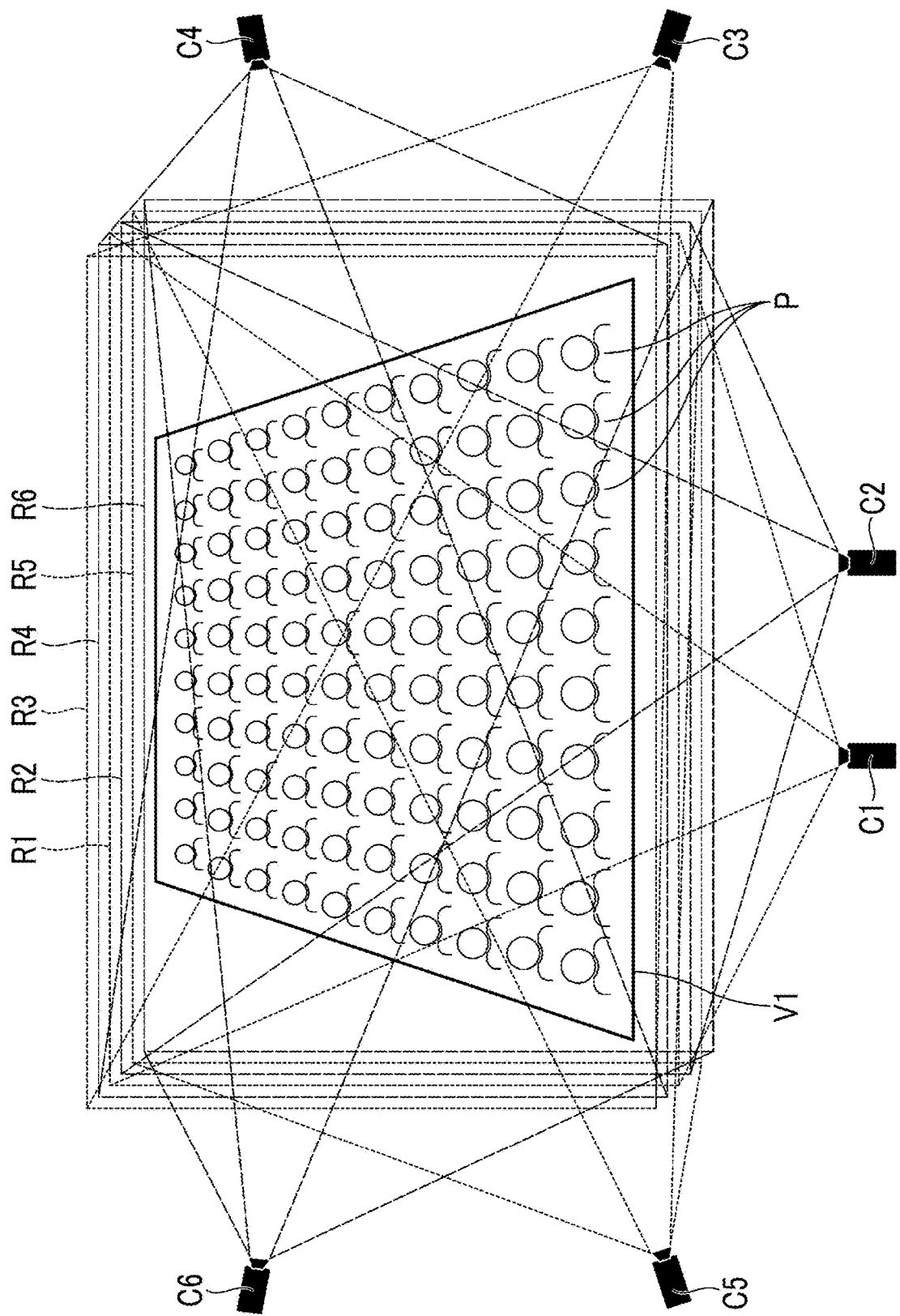
FIG. 3 is a conceptual diagram illustrating the imaging of an area.

FIG. 3 is a conceptual diagram illustrating the imaging of the area. FIG. 3 illustrates an example of a case in which the area V1 is imaged.

As illustrated in FIG. 3, in this embodiment, one area V1 is imaged by six cameras C1 to C6. Each of the cameras C1 to C6 images the area V1 at a predetermined position. That is, the area V1 is imaged at fixed point positions. Each of the cameras C1 to C6 is installed, for example, on a remote-control camera platform (electric camera platform) and is configured such that an imaging direction can be adjusted.

The first camera C1 images the area V1 from the front side. The second camera C2 images the area V1 from diagonally above the front side. The third camera C3 images the area V1 from the right side. The fourth camera C4 images the area V1 from the upper right side. The fifth camera C5 images the area V1 from the left side. The sixth camera C6 images the area V1 from the upper left side. The cameras C1 to C6 perform imaging at the same frame rate and synchronously.

Imaging ranges R1 to R6 of the cameras C1 to C6 are set to cover the area V1. Therefore, the imaging ranges R1 to R6 of the cameras C1 to C6 overlap each other. In addition, the cameras C1 to C6 are set such that the audiences have substantially the same size in the captured image.

As described above, a target area is imaged in multiple directions by a plurality of cameras, which makes it possible to effectively suppress the omission of the imaging of the face of each audience in the area. For example, even in a case in which an object is not capable of being imaged by one camera due to obstacles or the like, the object can be imaged by other cameras. Therefore, it is possible to effectively suppress the omission of imaging.

Similarly, the other areas V2 to V6 are imaged in a plurality of directions by a plurality of cameras. Therefore, cameras corresponding to the number of divided areas are prepared.

The images captured by each camera C are required to enable the recognition of at least the facial expressions of all of the audiences in the area to be imaged. That is, the images are required to have a resolution that enables facial expression analysis by image recognition. Therefore, it is preferable to use a camera having a high resolution as the camera C constituting the audience imaging device 10.

The image data captured by each camera C is transmitted to the image data processing device 100. The image data transmitted from each camera C includes, for example, identification information of each camera C and information of imaging conditions of each camera. The information of the imaging conditions of each camera C includes, for example, information of the position where the camera is installed, information of an imaging direction, and information of an imaging date and time.

[Image Data Processing Device]

The image data processing device 100 processes the image data transmitted from each camera C of the audience imaging device 10 and measures, for example, the emotional information of each audience in the image for each image data item. In addition, the image data processing device 100 generates map data, in which the measured emotional information of each audience or the like has been recorded in association with the positional information of each audience in the image, for each image data item. Further, the image data processing device 100 mutually interpolates the map data generated from each image data item. Furthermore, the image data processing device 100 combines the map data after the interpolation to generate composite map data indicating map data of the entire venue. Image data processing is performed for each frame.

Moreover, the image data processing device 100 performs a process of visualizing the composite map data as necessary. Specifically, a heat map is generated from the composite map data.

Figure 4:
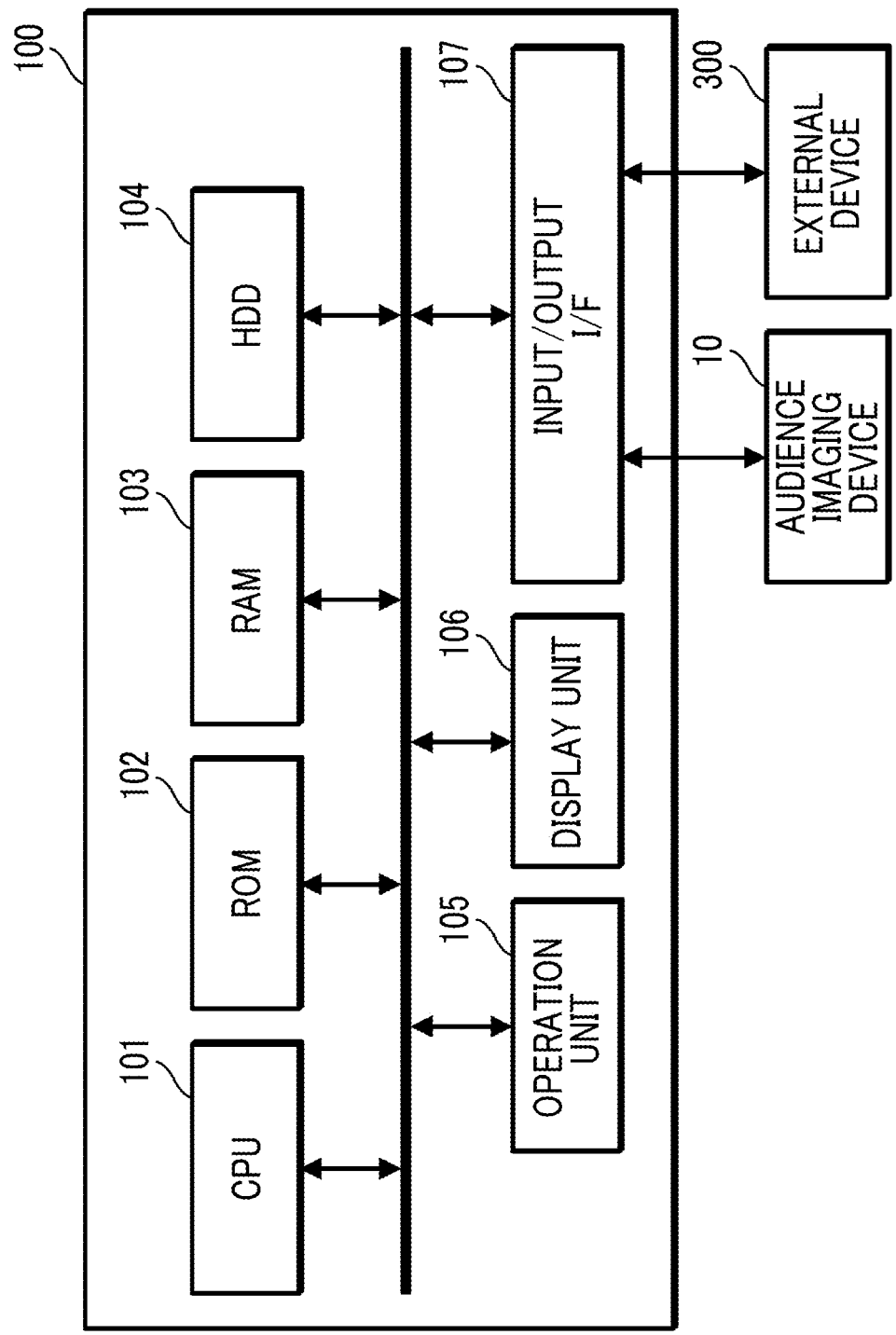
FIG. 4 is a block diagram illustrating an example of a hardware configuration of an image data processing device.

FIG. 4 is a block diagram illustrating an example of a hardware configuration of the image data processing device.

The image data processing device 100 is composed of a computer comprising, for example, a central processing unit (CPU) 101, a read only memory (ROM) 102, a random access memory (RAM) 103, a hard disk drive (HDD) 104, an operation unit 105, a display unit 106, and an input/output interface (I/F) 107. The CPU 101 is an example of a processor. The operation unit 105 is composed of, for example, a keyboard, a mouse, a touch panel, and the like. The display unit 106 is composed of, for example, a liquid crystal display, an organic EL display (an organic electroluminescence display or an organic light emitting diode display), and the like.

The image data captured by each camera C of the audience imaging device 10 is input to the image data processing device 100 through the input/output interface 107.

Figure 5:
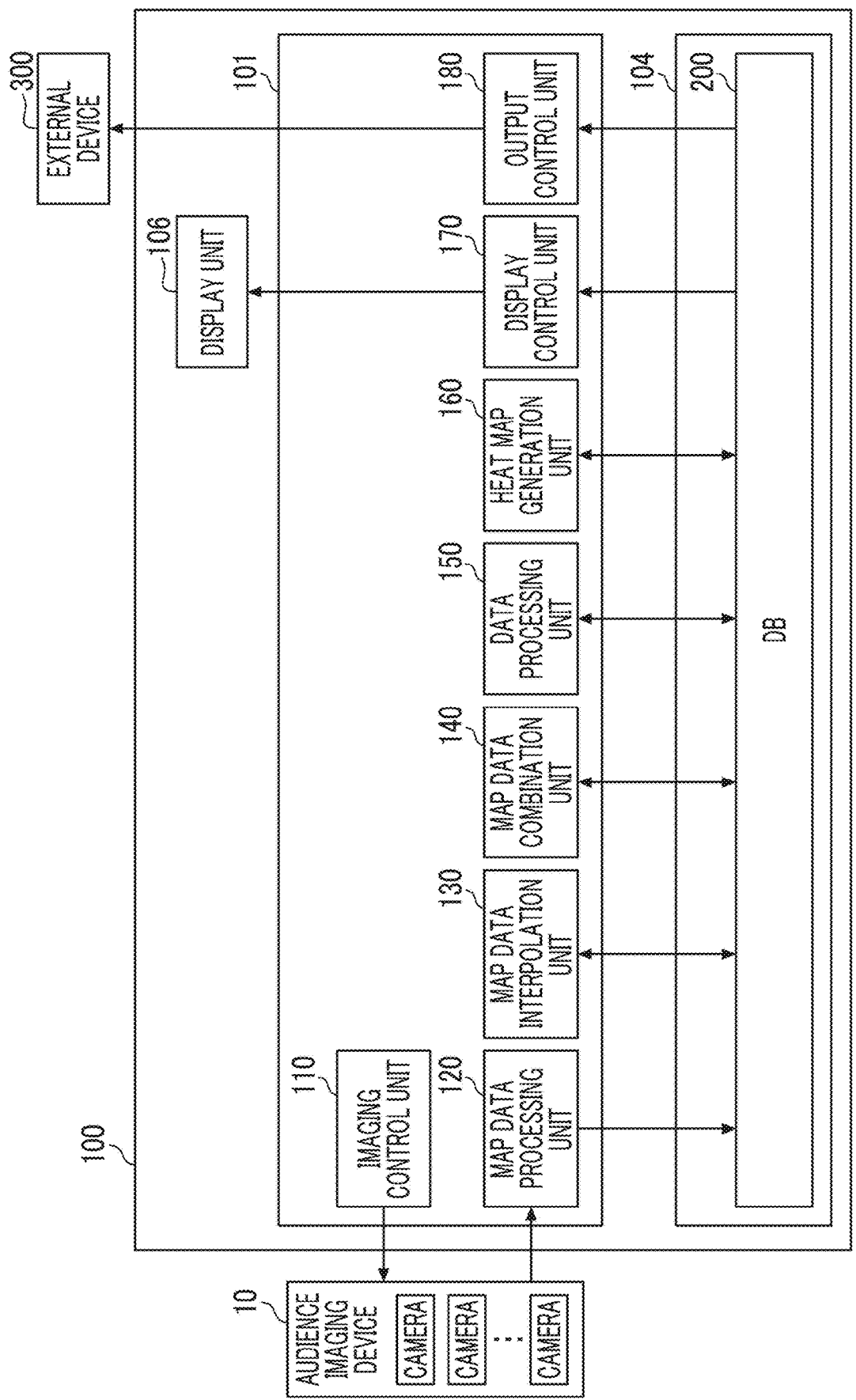
FIG. 5 is a block diagram illustrating functions implemented by an image data processing device.

FIG. 5 is a block diagram illustrating functions implemented by the image data processing device.

As illustrated in FIG. 5, the image data processing device 100 mainly has the functions of an imaging control unit 110, a map data processing unit 120, a map data interpolation unit 130, a map data combination unit 140, a data processing unit 150, a heat map generation unit 160, a display control unit 170, an output control unit 180, and the like. The CPU 101 executes a predetermined program to implement the functions of each unit. The program executed by the CPU 101 is stored in the ROM 103 or the HDD 104. Further, the program may be stored in a flash memory, a solid state disk (SSD), or the like in addition to the ROM 103 or the HDD 104.

The imaging control unit 110 controls the operation of the audience imaging device 10 in response to an operation input from the operation unit 105. Each camera C constituting the audience imaging device 10 performs imaging in response to an instruction from the imaging control unit 110. The control performed by the imaging control unit 110 includes the control of the exposure of each camera C, the control of the imaging direction, and the like.

The map data processing unit 120 generates map data from the image data captured by each camera C of the audience imaging device 10. The map data is generated for each image data item.

Figure 6:
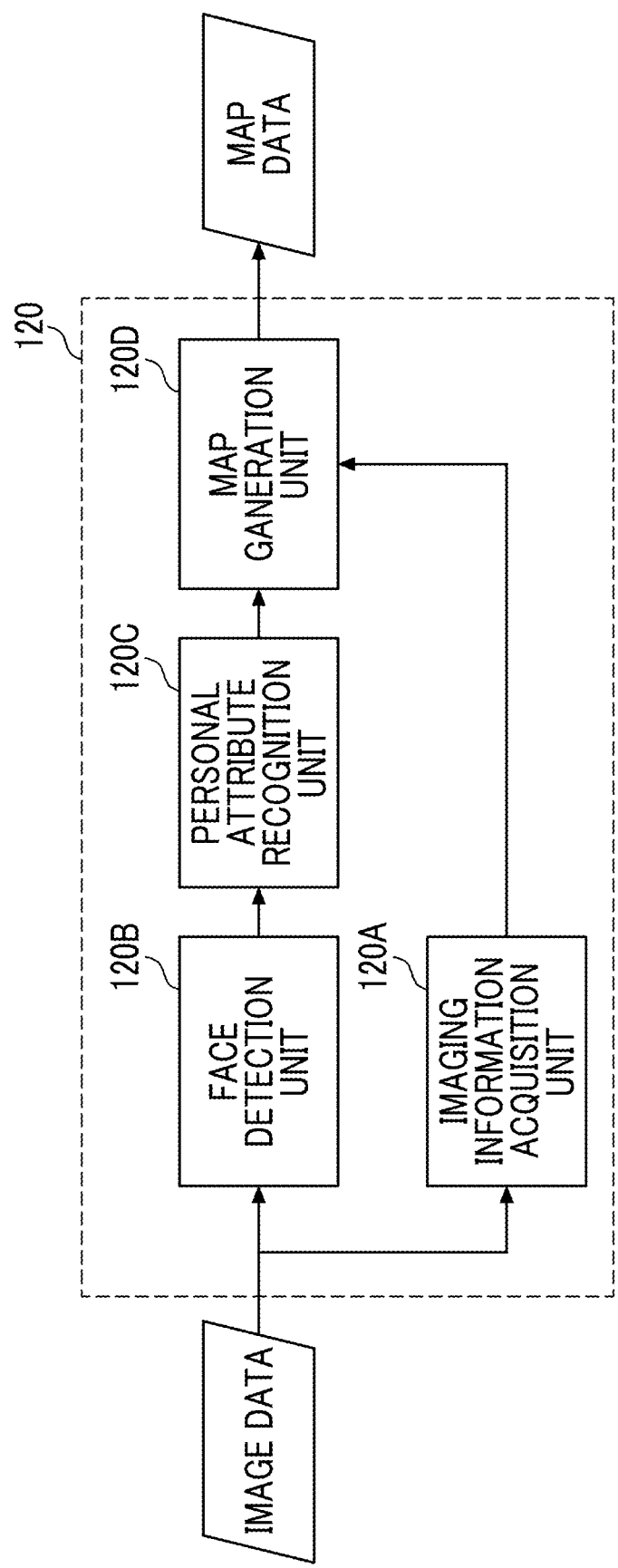
FIG. 6 is a block diagram illustrating functions of a map data processing unit.

FIG. 6 is a block diagram illustrating the functions of the map data processing unit.

As illustrated in FIG. 6, the map data processing unit 120 mainly has the functions of an imaging information acquisition unit 120A, a face detection unit 120B, a personal attribute recognition unit 120C, a map generation unit 120D, and the like.

The imaging information acquisition unit 120A acquires imaging information from the image data. Specifically, the identification information of the camera and the information of the imaging conditions of the camera included in the image data are acquired. The acquisition of this information makes it possible to specify the camera that has captured the image data and to specify the imaged area, the imaging position, and the imaging direction. In addition, it is possible to specify the imaging date and time. The specified information is output to the map generation unit 120D.

Figure 7:
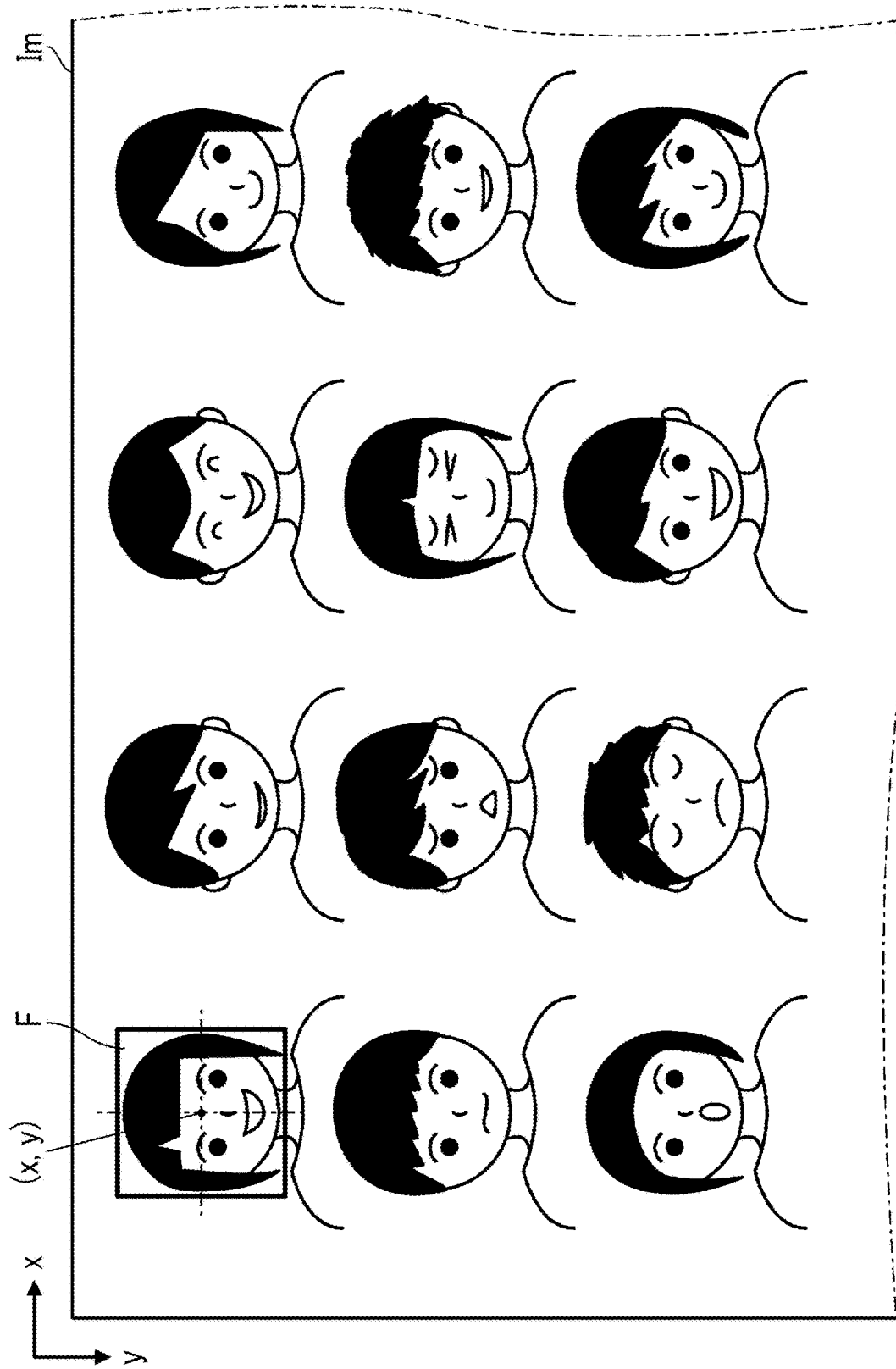
FIG. 7 is a conceptual diagram illustrating face detection.

The face detection unit 120B analyzes the image data to detect the faces of persons (audiences) present in the image indicated by the image data. FIG. 7 is a conceptual diagram illustrating the detection of the faces. The face detection unit 120B specifies positions and detects the faces. The position of the face is specified by a coordinate position (x, y) in an image Im. For example, the face detection unit 120B surrounds a detected face with a rectangular frame F, calculates the coordinates of the center of the frame F, and specifies the position of the face.

In addition, since a technique for detecting the face of the person from the image is a known technique, the detailed description thereof will not be repeated.

The detection of the face is performed, for example, by sequentially scanning the image Im from the upper left side to the lower right side. The detected faces are numbered in order of detection.

The personal attribute recognition unit 120C recognizes the personal attributes of the person (audience) on the basis of the image of the face of the person detected by the face detection unit 120B.

Figure 8:
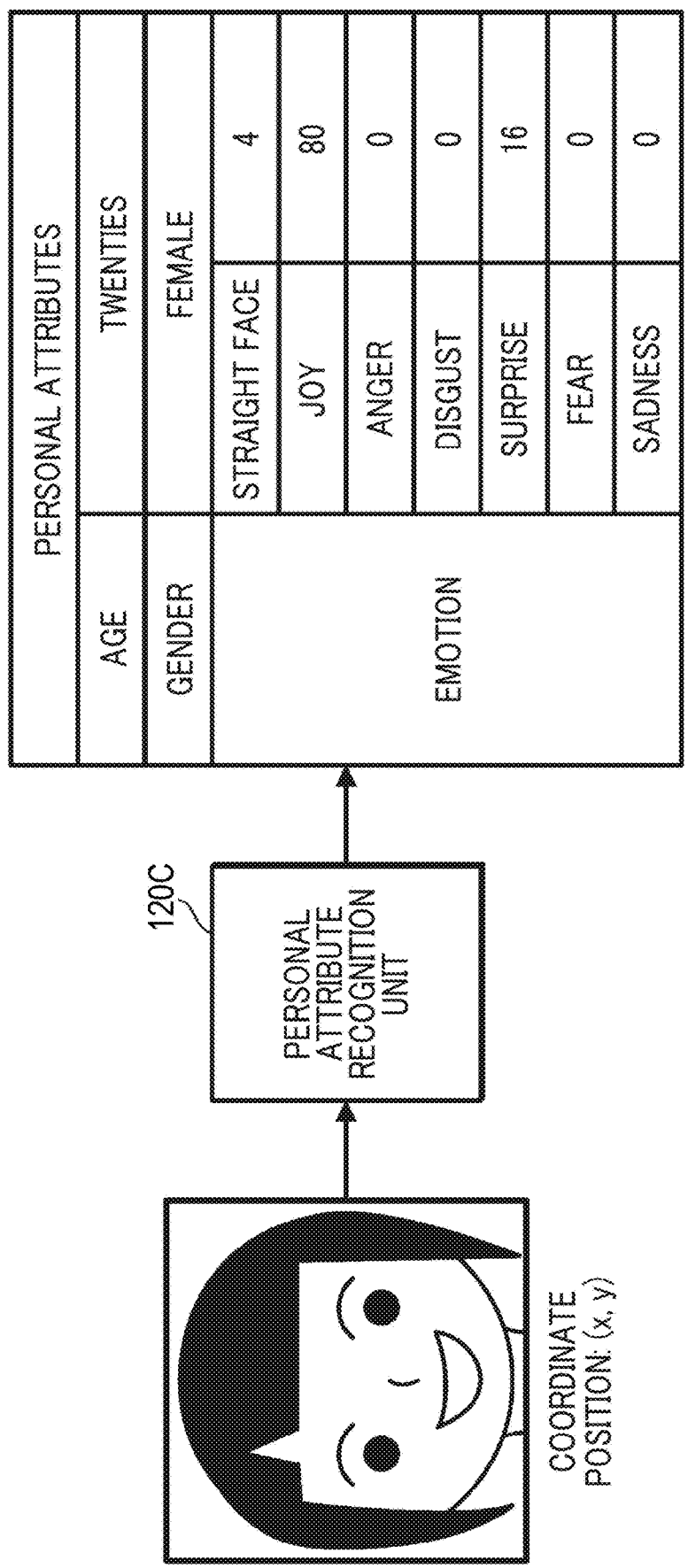
FIG. 8 is a block diagram illustrating the functions of the map data processing unit.

FIG. 8 is a conceptual diagram illustrating a personal attribute recognition process performed by the personal attribute recognition unit.

In this embodiment, age, gender, and emotion are recognized as the personal attributes. Known techniques can be used as a technique for recognizing age, gender, emotion, and the like from the image. For example, a recognition method using an image recognition model generated by machine learning, deep learning, and the like can be adopted.

Emotions are recognized, for example, from facial expressions. In this embodiment, facial expressions are classified into seven types of a "straight face", "joy", "anger", "disgust", "surprise", "fear", and "sadness", and the degree of each facial expression is calculated to recognize emotions. The facial expressions of "joy", "anger", "disgust", "surprise", "fear", and "sadness" correspond to the emotions of "joy", "anger", "disgust", "surprise", "fear", and "sadness", respectively. The "straight face" is expressionless and corresponds to a state in which there is no specific emotion.

A score (emotion score) obtained by quantifying the degree of each emotion (emotion-likeness) is output as the result of the emotion recognition. For example, the emotion score is output with a maximum value of 100. In this embodiment, each emotion score is output such that the sum of the emotion scores is 100.

For age, a specific age is not recognized, but an age group may be recognized. For example, there are less than ten years of age, teens, twenties, and so on. In this embodiment, the age group is recognized from the image of the face. For gender, a man and a woman are recognized from the image of the face.

The map generation unit 120D generates map data on the basis of the imaging information acquired by the imaging information acquisition unit 120A and the personal attributes recognized by the personal attribute recognition unit 120C.

In the map data, the information of the personal attributes of each audience is recorded in association with the information of the face of each audience in the image. The position of the audience is specified, for example, by the coordinate position of the face of the audience.

The map data is generated for each image data item. Further, the imaging information of the image data which is the source of the map data is added to the map data. That is, for example, the identification information of the camera that has captured the image data and the information of the imaging conditions of the camera are added. This makes it possible to specify which area the map data is for. In addition, it is possible to specify when the map data is obtained.

Figure 9:
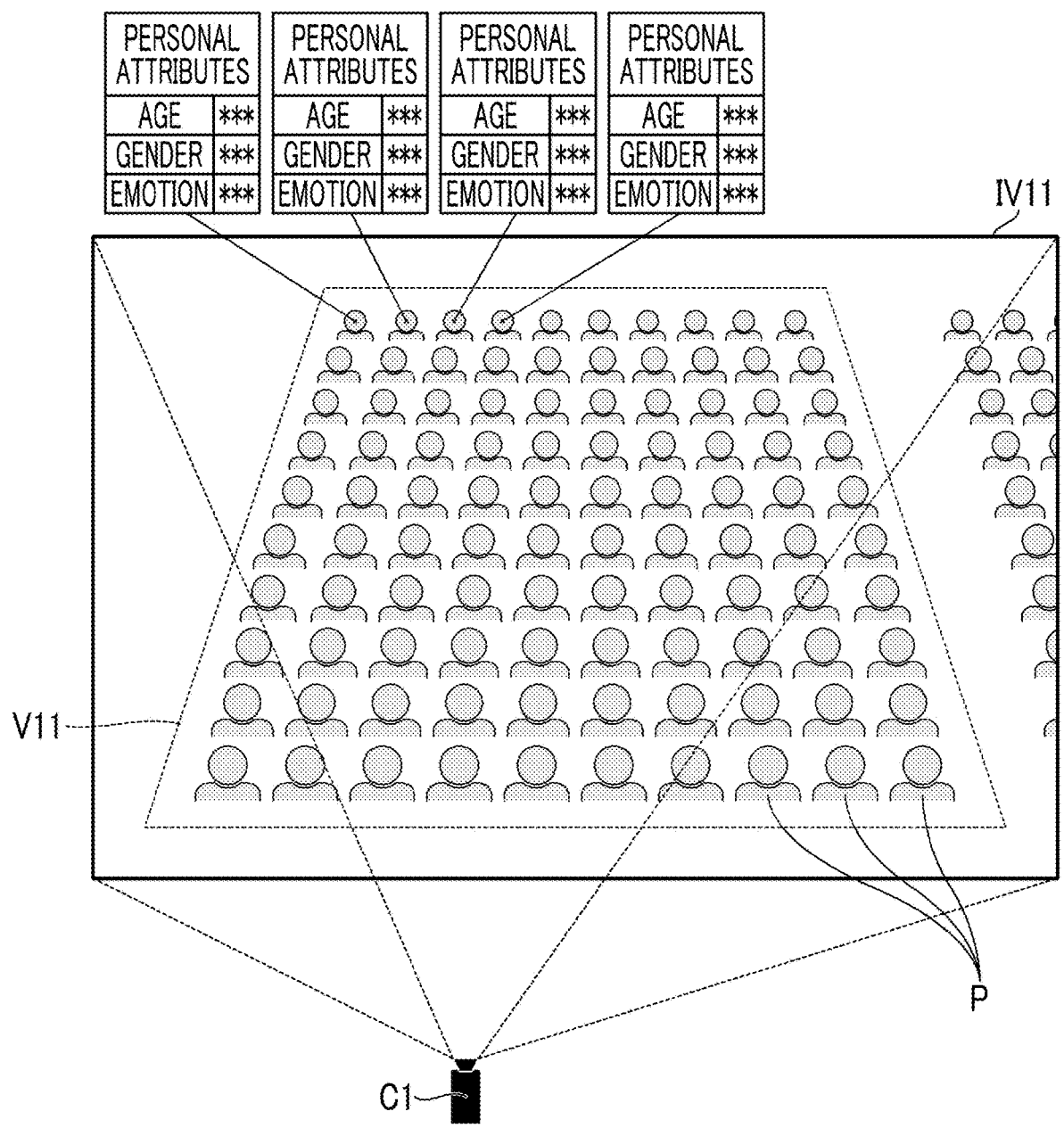
FIG. 9 is a conceptual diagram illustrating generation of map data.

FIG. 9 is a conceptual diagram illustrating the generation of the map data. FIG. 9 illustrates an example of a case in which map data is generated from the image data obtained by imaging the area V1 with the first camera C1.

As illustrated in FIG. 9, in the map data, the information of the personal attributes of each audience is recorded in association with the position of each audience in the image.

FIG. 10 is a diagram illustrating an example of the map data.

As illustrated in FIG. 10, for each audience whose face has been detected in the image, the information of the coordinate position and the information of the recognized personal attributes are recorded. This map data is generated for each image data item.

The map data generated by the map generation unit 120D is recorded on a database 200.

FIG. 11 is a diagram illustrating an example of the database.

The map data is recorded on the database in time series in association with the information of the cameras C1 to C6 which is the generation source of the map data. In addition, the information of each of the cameras C1 to C6 is recorded on the map data in association with the information of the target areas V1 to V6.

The database 200 manages the map data generated from all of the cameras in units of events. In addition, for example, map data interpolated by the map data interpolation unit 130, composite map data generated from the interpolated map data, data obtained by processing the composite map data, and a heat map generated from the data obtained by processing the composite map data are recorded on the database 200. The database 200 is stored in, for example, the HDD 104.

The map data interpolation unit 130 interpolates the information of the personal attributes of each audience between the map data items having the overlapping information of the personal attributes of the same audience.

The map data items in which the imaging ranges of the image data, which is the generation source of the map data, overlap each other have the information of the personal attributes of the same audience in the area in which the imaging ranges overlap each other.

Each map data item does not necessarily have the information of the personal attributes of all of the audiences. The reason is that, in a case in which it is difficult to detect the face in the image data which is the generation source of the map data, it may be difficult to recognize the personal attributes from the face.

In the image data processing system according to this embodiment, the overlapping area is imaged in multiple directions by a plurality of cameras. Therefore, for example, even in a case in which it is difficult to image the face of a certain audience with one camera, the face may be imaged by other cameras.

In the image data processing system according to this embodiment, the information of the personal attributes of each audience is interpolated between the map data items having the overlapping information of the personal attributes of the same audience. In this way, high-accuracy map data is generated.

Hereinafter, a map data interpolation process performed by the map data interpolation unit 130 will be described.

Figure 12:
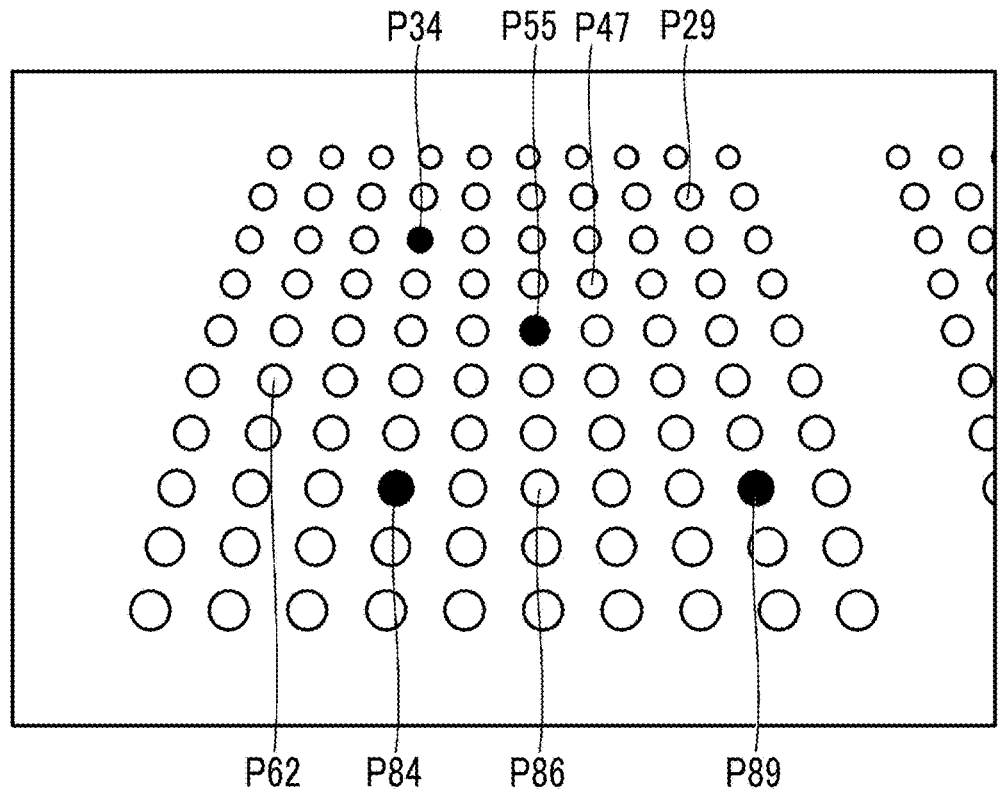
FIG. 12 is a conceptual diagram illustrating face detection.
Figure 13:
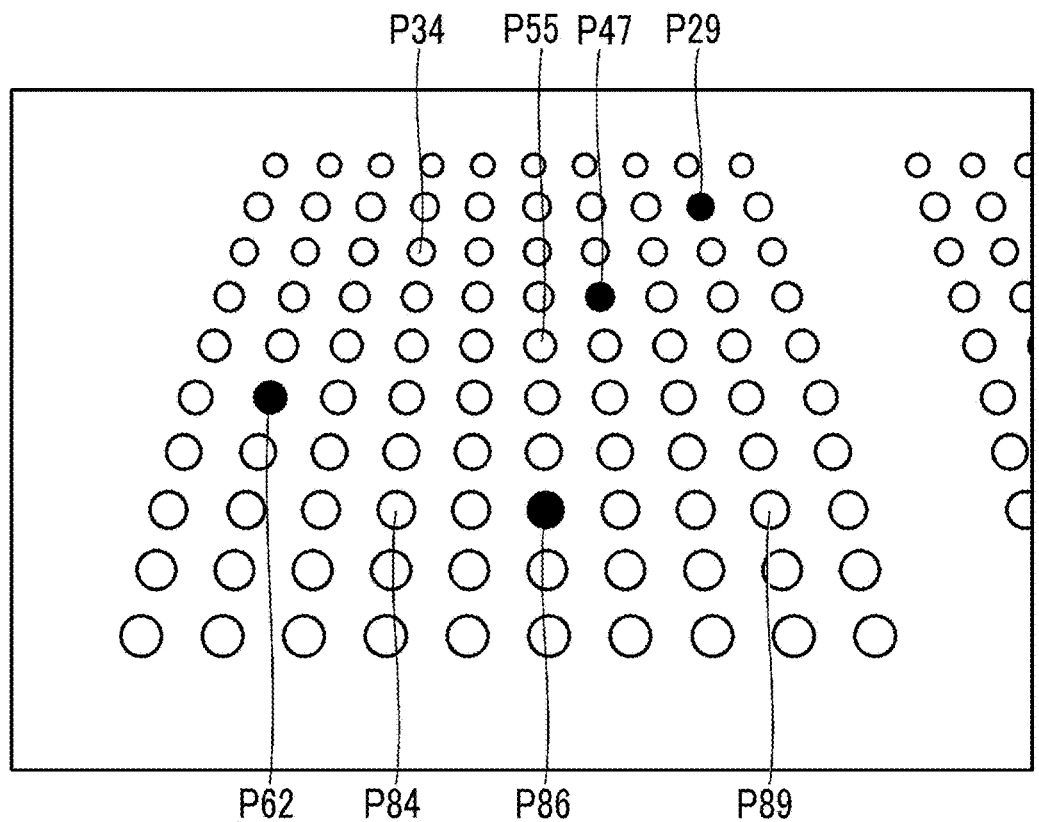
FIG. 13 is a conceptual diagram illustrating the face detection.

FIGS. 12 and 13 are diagrams illustrating examples of the detection results of the faces. FIG. 12 illustrates an example of the detection of the faces from the image obtained in a case in which the area V1 is imaged by the first camera C1. FIG. 13 illustrates an example of the detection of the faces from the image obtained in a case in which the area V1 is imaged by the second camera C2. In FIGS. 12 and 13, a white circle indicates the position of the audience whose face has been detected in the image. On the other hand, a black circle indicates the position of the audience whose face has not been detected in the image.

The map data generated from the image captured by the first camera C1 is referred to as first map data, and the map data generated from the image captured by the second camera C2 is referred to as second map data.

As illustrated in FIG. 12, the faces of audiences P34, P55, P84, and P89 are not detected from the image captured by the first camera C1. Therefore, in this case, in the first map data, the information of the personal attributes of the audiences P34, P55, P84, and P89 is lost.

On the other hand, as illustrated in FIG. 13, the faces of the audiences P34, P55, P84, and P89 are detected from the image captured by the second camera C2. Therefore, in the second map data, the information of the personal attributes of the audiences P34, P55, P84, and P89 is present. In this case, the information of the audiences lost in the first map data can be interpolated with the second map data. That is, the information of the personal attributes of the audiences P34, P55, P84, and P89 lost in the first map data can be interpolated with the information of the second map data.

Similarly, as illustrated in FIG. 13, the faces of audiences P29, P47, P62, and P86 are not detected from the image captured by the second camera C2. Therefore, in this case, in the second map data, the information of the personal attributes of the audiences P29, P47, P62, and P86 is lost.

On the other hand, as illustrated in FIG. 12, the faces of the audiences P29, P47, P62, and P86 are detected from the image captured by the first camera C1. Therefore, in the first map data, the information of the personal attributes of the audiences P29, P47, P62, and P86 is present. In this case, the information of the audiences lost in the second map data can be interpolated with the first map data. That is, the information of the personal attributes of the audiences P29, P47, P62, and P86 lost in the second map data can be interpolated with the information of the first map data.

In this way, the map data items generated from the images having the overlapping area have the information of the personal attributes of the same audience in the area in which the images overlap each other. Therefore, in a case in which information items are lost, they can be mutually interpolated.

In addition, the example in which the insufficient information items of the personal attributes of the audiences between two map data items are mutually interpolated has been described above. However, the information of the personal attributes of each audience is interpolated between the map data items having the overlapping information of the personal attributes of the same audience.

In the interpolation process, first, data is collated between the map data items having the overlapping information of the personal attributes of the same audience, and the information of the personal attributes of the audience lost in each map data item is specified. The map data having the lost information of the personal attributes of the audience is interpolated with the corresponding information of the personal attributes of the audience in another map data item. In a case in which the information of the personal attributes of the same audience is present in a plurality of map data items, for example, the information of the personal attributes with high recognition accuracy is adopted.

During data collation, data matching is performed on the basis of the disposition relationship of each audience. That is, the overlapping audience is specified from the disposition pattern of each audience in the image. In addition, data matching may be performed on the basis of the information of the personal attributes of the audiences at each position.

The map data subjected to the interpolation process by the map data interpolation unit 130 is recorded on the database 200 (see FIG. 11).

The map data combination unit 140 combines the map data items after the interpolation to generate one composite map data item. The composite map data is map data in which the information of the personal attributes of all of the audiences in the venue has been recorded in association with the position of the face of each audience.

The composite map data is generated from the map data at the same imaging timing. Therefore, the composite map data is sequentially generated in time series.

The information of the camera is used for combination. That is, the map data is generated from the images captured by the cameras, and each camera images a predetermined area under predetermined conditions (a position and a direction). Therefore, the use of the information of the cameras make it possible to easily combine the map data.

In addition, the combination may be performed using the image data which is the generation source of the map data. That is, since the image data and the map data correspond to each other, the image data can be combined to combine the map data. For example, a method, such as panorama composition, can be used to combine the image data.

As described above, in the image data processing system 1 according to this embodiment, a plurality of map data items are generated, and one composite map data item is generated from the generated plurality of map data items. Therefore, even in a large event venue, it is possible to easily generate one map data item in which the information of the personal attributes of each audience has been recorded. In addition, even in a small event venue, it is possible to generate map data for the entire venue with higher efficiency than that in a case in which the entire venue is imaged by one camera to generate map data. That is, the venue is divided into a plurality of areas, and processing is performed. Therefore, it is possible to perform distributed processing and to generate map data for the entire venue with high efficiency.

The generated composite map data is recorded on the database 200 in association with the map data which is the generation source of the composite map data (see FIG. 11).

The data processing unit 150 processes the composite map data to generate data for each audience in the venue.

The user sets which data to generate. For example, data indicating the emotional state of each audience is generated, data indicating the amount of specific emotion is generated, or data indicating the degree of excitement is generated.

For example, the data indicating the emotional state is acquired by extracting the emotion with the highest score from the recognition results of emotions. For example, the emotional state is joy in a case in which the recognition results (scores) of the emotions of a certain audience are as follows: straight face: 12, joy: 75, anger: 0, disgust: 0, surprise: 10, fear: 3, and sadness: 0.

The data indicating the amount of specific emotion is data obtained by quantifying, for example, the level of the specific emotion or the magnitude of the amplitude of the specific emotion.

The data for the emotional level is calculated from emotion scores. For example, data for the emotional level of joy is acquired from the score of joy. In addition, for example, the data for the emotional levels of joy and surprise is acquired by calculating the sum of the scores of joy and surprise. In this case, a weight may be given to each emotion, and the data for the emotional level may be calculated. That is, the score of each emotion may be multiplied by a predetermined coefficient, and the sum of the scores may be calculated.

For example, the data for the amplitude of the emotion is acquired by calculating the difference between the scores of the emotion at predetermined time intervals. For example, the amplitude of the emotion of joy is acquired by calculating the difference between the scores of joy at predetermined time intervals. Further, for example, the amplitudes of the emotions of joy and sadness are acquired by calculating the difference between the score of joy and the score of sadness at predetermined time intervals (for example, the difference between the score of joy at a time t and the score of sadness at a time t+Δt).

For the amount of emotion, which emotion is to be detected depends on the type of event. For example, at a concert, it is considered that the magnitude of the emotional level of joy mainly leads to the degree of satisfaction of the audience. Therefore, in the case of concerts, the emotional level of joy is to be detected. On the other hand, in watching sports, it is considered that the magnitude of the amplitude of emotions (for example, the magnitude of the amplitude of the emotions of joy and sadness) mainly leads to the degree of satisfaction of the audience. Therefore, in the case of watching sports, the magnitude of the amplitude of emotions is to be detected.

The degree of excitement is the numerical representation of the level of excitement of each audience. The degree of excitement is calculated from the scores of emotions using a predetermined arithmetic expression. For example, in a case in which the score of the emotion of a straight face is S1, the score of the emotion of joy is S2, the score of the emotion of anger is S3, the score of the emotion of disgust is S4, the score of the emotion of surprise is S5, the score of the emotion of fear is S6, and the score of the emotion of sadness is S6, an arithmetic expression Fn is defined as Fn=(a×S1)+(b×S2)+(c×S3)+(d×S4)+(e×S5)+(f×S6)+(g×S7). Here, a to g are weighting coefficients for each emotion which are determined for each event. That is, a is a coefficient for the emotion of a straight face, b is a coefficient for the emotion of joy, c is a coefficient for the emotion of anger, d is a coefficient for the emotion of disgust, e is a coefficient for the emotion of surprise, f is a coefficient for the emotion of fear, and g is a coefficient for the emotion of sadness. For example, in the case of a concert and the like, a high weight is given to the coefficient a for the emotion of joy.

Each of the above-described data items is an example of data generated by the data processing unit 150. The data processing unit 150 generates data in response to an instruction input from the user through the operation unit 105. For example, the user selects an item from the items prepared in advance and designates the data to be generated.

The data (processed data) processed by the data processing unit 150 is recorded on the database 200 in association with the composite map data which is a processing source (see FIG. 11).

The heat map generation unit 160 generates a heat map from the data processed by the data processing unit 150. In the heat map generated by the image data processing device 100 according to this embodiment, the data of the audiences at each position in the venue is displayed in color or color shading. For example, a heat map for the amount of emotion is generated by displaying the value of the amount of emotion of the audience at each position in color or color shading. In addition, a heat map for the degree of excitement is generated by displaying the value of the degree of excitement of the audience at each position in color or color shading.

Figure 14:
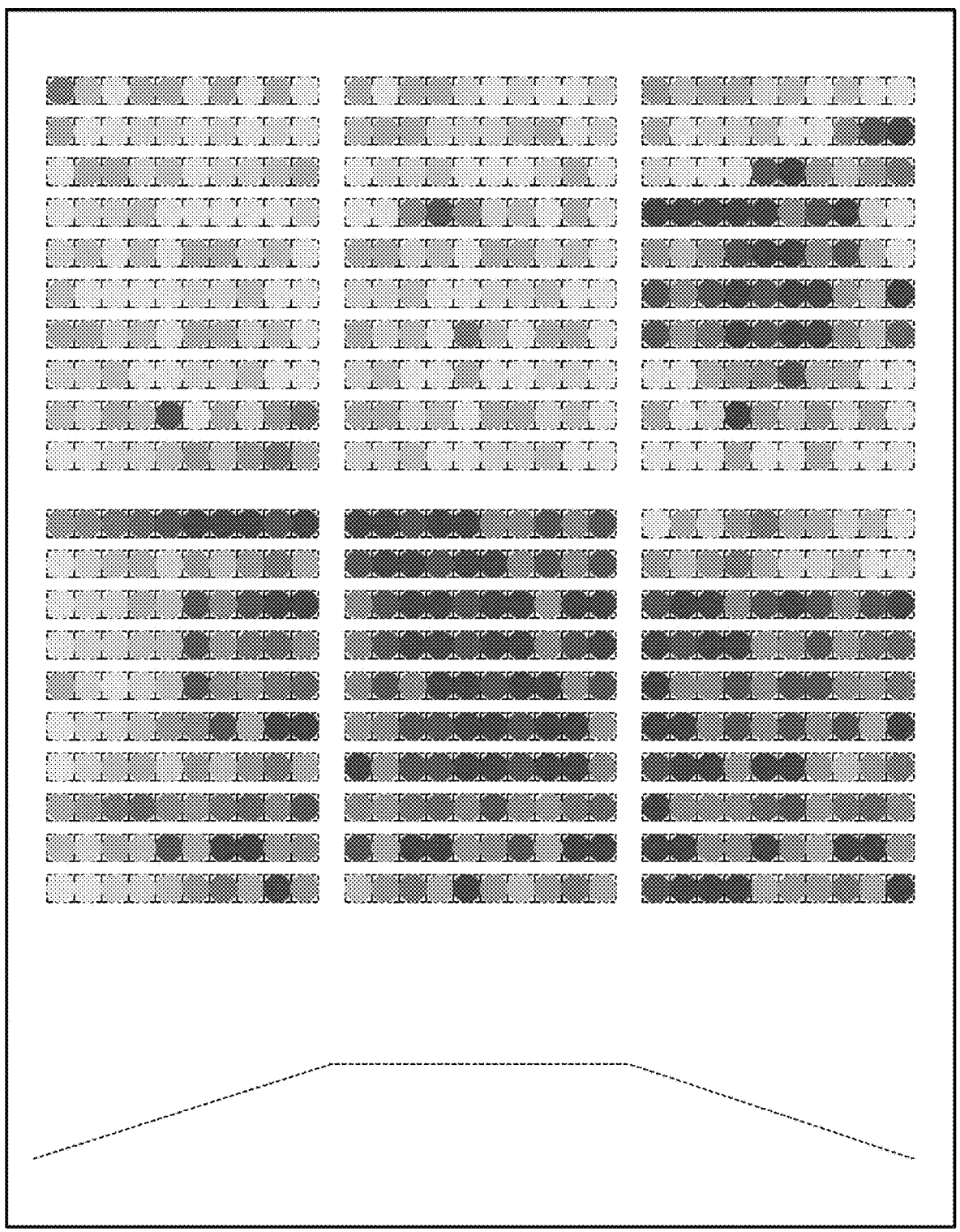
FIG. 14 is a diagram illustrating an example of a heat map for the degree of excitement.

FIG. 14 is a diagram illustrating an example of the heat map for the degree of excitement.

In FIG. 14, a heat map is generated using a seat chart of an event venue. The seat chart is a plan view illustrating the disposition of seats in the event venue. The positions of the seats correspond to the positions of each audience. The position of each seat in the seat chart can be in one-to-one correspondence with the coordinate position of each audience in the composite map data. Therefore, the display of the value of the degree of excitement of each audience at the position of each seat in color or color shading makes it possible to generate the heat map for the degree of excitement.

FIG. 15 is a diagram illustrating an example of the display aspect of the degree of excitement. FIG. 15 illustrates an example of a case in which the degree of excitement is represented by shading. The degree of excitement is divided into a plurality of sections in a calculable range. Density to be displayed is determined for each divided section. FIG. 15 illustrates an example of a case in which the degree of excitement is calculated as a numerical value of 1 to 100 and illustrates an example of a case in which the degree of excitement is divided into 10 sections and displayed. In addition, FIG. 15 illustrates an example of a case in which the displayed density increases as the degree of excitement increases.

Data of the heat map generated by the heat map generation unit 160 is recorded on the database 200 in association with the data which is the generation source of the heat map (see FIG. 11).

The display control unit 170 displays the data generated by the data processing unit 150 on the display unit 106 in response to a display instruction input from the user through the operation unit 105. In addition, the heat map generated by the heat map generation unit 160 is displayed on the display unit 106.

The output control unit 180 outputs the data generated by the data processing unit 150 to an external device 300 in response to an output instruction input from the user through the operation unit 105. Further, the heat map data generated by the heat map generation unit 160 is output to the external device 300.

[Operation]

Figure 16:
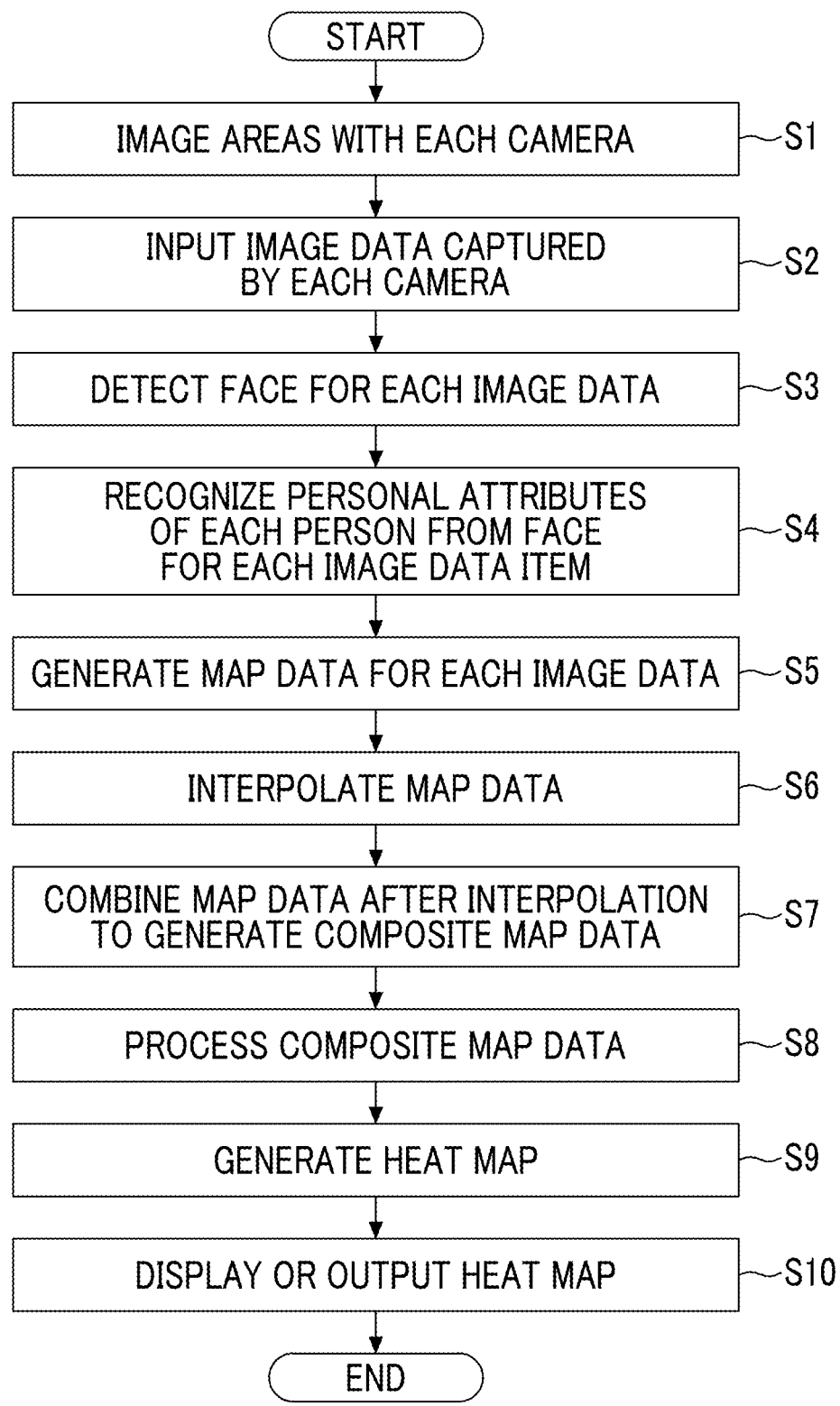
FIG. 16 is a flowchart illustrating an image data processing procedure in the image data processing system.

FIG. 16 is a flowchart illustrating an image data processing procedure in the image data processing system according to this embodiment.

First, each camera C of the audience imaging device 10 images each of the areas V1 to V6 in the venue (Step S1). Each of the areas V1 to V2 is imaged in multiple directions by a plurality of cameras.

The image data processing device 100 inputs image data captured by each camera C (Step S2). The image data of each camera C is collectively input after an event ends. In addition, the image data may be input in real time.

The image data processing device 100 individually processes the input image data of each camera C to detect the face of each audience in the image from the image indicated by each image data item (Step S3).

The image data processing device 100 recognizes the personal attributes of each audience from the detected face (Step S4).

The image data processing device 100 generates map data for each image data item on the basis of the recognition results of the personal attributes of each audience in each image data item (Step S5). The map data is generated by recording the information of the personal attributes of each audience in association with the information of the position of each audience in the image.

The personal attributes of all of the audiences are not necessarily recorded on the generated map data. In some cases, the faces are hidden by obstacles. Therefore, it is not always possible to recognize the personal attributes of all of the audiences all the time.

Therefore, after generating the map data from each image data item, the image data processing device 100 interpolates data between the map data items having the overlapping area (Step S6). That is, the information of the personal attributes of the audience lost in one map data item is interpolated using the information recorded on another map data item. Therefore, it is possible to suppress the loss of data in the map data.

The image data processing device 100 combines the map data after the interpolation to generate composite map data indicating the map data of the entire venue (Step S7).

The image data processing device 100 processes the composite map data to generate data corresponding to the instruction from the user (Step S8). For example, data for the amount of emotion of each audience, data for the degree of excitement, and the like are generated.

The image data processing device 100 generates a heat map from the generated data in response to an instruction from the user (Step S9).

The image data processing device 100 displays the generated heat map on the display unit 106 or outputs the heat map to the external device 300 in response to an instruction from the user (Step S10).

As described above, according to the image data processing system 1 of this embodiment, the map data including the information of the personal attributes of all of the audiences in the venue is generated. Therefore, it is possible to generate accurate map data with high efficiency even in a case in which the map data for a large venue is generated. In addition, a processing load can be less than that in a case in which map data for all of the audiences is generated at once.

In addition, each map data item has at least partly overlapping information of the personal attributes of the audience. Therefore, information lost in one map data item can be interpolated with another map data item. Therefore, it is possible to collect the information of the personal attributes of each audience without omission in each map data item.

Modification Examples (1) Imaging Method

In the above-described embodiment, the viewing area of the venue is divided into a plurality of areas, and each area is imaged in a plurality of directions by a plurality of cameras. However, a method for imaging the audiences in the venue is not limited to this configuration. Each audience may be imaged by at least two or more cameras. This enables interpolation.

Figure 17:
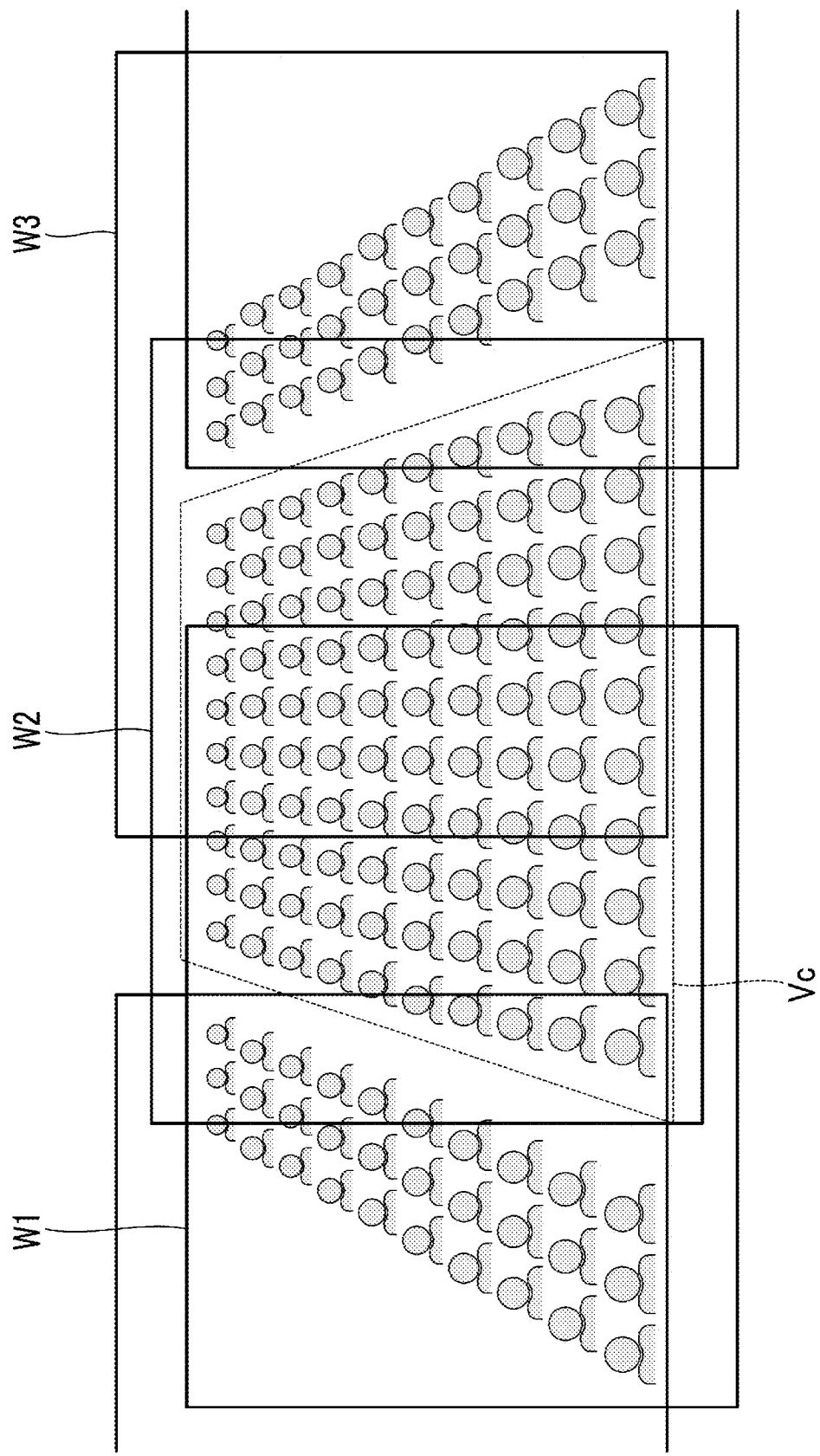
FIG. 17 is a diagram illustrating another example of a method for imaging audiences.

FIG. 17 is a diagram illustrating another example of the method for imaging the audiences.

In FIG. 17, frames W1 to W3 indicate the imaging ranges of the cameras. As illustrated in FIG. 17, in this example, the imaging ranges of each camera are set to at least partially overlap in an area Vc. In addition, the imaging ranges of each camera are set such that each audience is imaged by at least two cameras in the area Vc.

It is preferable that each camera images the area in which the imaging ranges overlap each other under different conditions. For example, as in the above-described embodiment, the area in which the imaging ranges overlap each other is imaged in different directions. Therefore, even in a case in which the face of the audience is hidden by obstacles and the like in the image captured by one camera, it is possible to capture the image using another camera.

In addition, the overlapping area may be imaged with different exposures. In this case, the area may be imaged substantially in the same direction. For example, even in a situation in which the face is not capable of being detected in the image captured by one camera due to flares and/or ghosts (sunlight, reflections, flash, and the like) occurring in the image, the imaging of the overlapping area with different exposures makes it possible to detect the face from the image captured by another camera.

As a method for adjusting the exposure, in addition to a method for changing an f-number, a shutter speed, or sensitivity to adjust the exposure, a method may be adopted which adjusts the exposure using an optical filter such as a neutral density (ND) filter.

(2) Captured Image

In the above-described embodiment, the case in which a moving image is captured and processed in units of frames has been described as an example. However, the invention can also be applied to a case in which a still image is captured and processed.

In addition, the moving image also includes a case in which still images are continuously captured at predetermined time intervals and processed. For example, the moving image also includes a case in which interval imaging, time-lapse imaging, and the like are performed and images are processed.

(3) Personal Attributes

In the above-described embodiment, the case in which the age, gender, and emotion of each audience are recognized as the personal attributes recognized from the face has been described as an example. However, the personal attributes recognized from the face are not limited thereto. In addition, for example, the personal attributes may include personal identification information for identifying an individual audience. That is, the personal attributes may include personal recognition information. The recognition of the personal identification information is performed using, for example, a face recognition database in which a face image and personal identification information are stored in association with each other. Specifically, the recognition is performed by performing a collation process between the detected face image and the face image stored in the face recognition database and acquiring personal identification information corresponding to the matched face image from the face recognition database. Information, such as the age and gender of the audience, can be associated with the personal identification information. Therefore, in a case in which the personal identification information is recognized, it is not necessary to recognize age, gender, and the like.

(4) Map Data Interpolation Process

The interpolation of the map data is performed between map data items having the information of the personal attributes of the same person. This map data is map data generated from image data having the overlapping imaging range.

The interpolation of the map data is based on interpolating the information of the personal attributes of the person lost in one map data item with another map data item. In addition, even in a case in which there is no loss, it is possible to interpolate the information of the personal attributes of each person as follows.

(a) Adoption of Information of Personal Attributes with High Recognition Accuracy In a case in which the information of the personal attributes of the same person is present in a plurality of map data items, the information of the personal attributes with relatively low recognition accuracy is replaced with the information of the personal attributes with relatively high recognition accuracy to interpolate the information of the personal attributes of each person. Specifically, the information of the personal attributes with the highest recognition accuracy is adopted. In this case, all of the information of map data other than the map data having the information of the personal attributes with the highest recognition accuracy is rewritten.

In this case, the personal attribute recognition unit 120C calculates recognition accuracy in addition to the recognition of the personal attributes. An algorithm that is commonly known in image recognition can be adopted as an algorithm for calculating the recognition accuracy (also referred to as a reliability degree, an evaluation value, and the like).

(b) Calculation of Average of Personal attributes of Same Person Between Map Data Items The average of the personal attributes of the same person between the map data items having the information of the personal attributes of the same person is calculated to calculate the personal attributes of the corresponding person. In this case, the information of each map data item is replaced with the calculated average.

(c) Calculation of Weighted Average Corresponding to Recognition Accuracy

In a case in which the average of the personal attributes of the same person is calculated, the average is calculated by adding a weight corresponding to the recognition accuracy of the personal attributes. A larger weight is given to the personal attributes with higher recognition accuracy.

Each of the above-described methods can also be adopted in a case in which the information of the personal attributes of the person lost in one map data item with another map data item. In other words, each of the above-described methods can also be adopted in a case in which there are a plurality of map data items having the information of the personal attributes of the person lost in one map data item.

In addition, in a case in which the personal attributes with low recognition accuracy are adopted, the reliability of the map data may be reduced. For this reason, in a case in which interpolation is performed, it is preferable to adopt only the information of the personal attributes having a recognition accuracy equal to or greater than a threshold value. It is preferable that the threshold value can be set by the user. This threshold value is an example of a first threshold value.

(5) Selection of Interpolation Method

A configuration may be used in which the user can select any method for interpolating the map data. In this case, for example, a method can be adopted in which executable interpolation methods are displayed on the display unit 106 such that the user selects an interpolation method through the operation unit 105.

In addition, a configuration may be used in which a heat map is generated whenever the selection of the interpolation method is switched and the generated heat map is displayed on the display unit. This makes it possible to easy select a preferred interpolation method.

Alternatively, a method may be adopted in which the image data processing device 100 automatically determines and selects the optimum interpolation method. The following methods can be considered as a method for automatically determining the interpolation method.

(a) An interpolation method that maximizes the number of personal attributes of a person extracted in the designated time and/or the designated area including the entirety is selected.

(b) An interpolation method that maximizes the average of the recognition accuracy of the personal attributes of a person extracted in the designated time and/or the designated area including the entirety is selected.

(c) An interpolation method that minimizes a variation in the recognition accuracy of the personal attributes of a person extracted in the designated time and/or the designated area including the entirety is selected.

(d) An interpolation method that can extract all of the personal attributes of the designated person is selected.

(e) An interpolation method that maximizes the average of the recognition accuracy of the personal attributes of the designated person is selected.

(f) An interpolation method that minimizes a variation in the recognition accuracy of the personal attributes of the designated person is selected.

The user designates time, an area, and a person through the operation unit 105.

(6) Process in Case in Which Interpolation Is Not Possible from Any Map Data

A situation may occur in which the audience is not capable of being imaged by any camera. In this case, the information of the personal attributes of the corresponding person is lost at the corresponding time. In a case in which the personal attributes of a person in a specific time slot is lost, the information of the personal attributes of the corresponding person is interpolated by the following method.

First, changes in the personal attributes of all audiences over time are calculated. Then, a person whose personal attribute information is lost in a specific time slot is specified. Then, a person having a similar change in personal attributes over time to the specified person is specified. The information of the personal attributes lost in the time slot is interpolated using the information of the personal attributes of the specified person.

This method is effective in a case in which emotions are recognized as the personal attributes. In other words, the lost information of emotions is interpolated with the information of a person having a similar emotional change. The reason is that persons are considered to have similar reactions with respect to emotions.

(7) Correction of Map Data After Interpolation

The interpolated map data can be further corrected and used. For example, a person whose personal attribute recognition accuracy is low is excluded from the map data throughout the duration of the event. This makes it possible to improve the reliability degree of the map data after interpolation. This process is performed, for example, as follows.

First, the recognition accuracy of the personal attributes of all persons throughout the duration of the event is calculated. Then, a person whose recognition accuracy is equal to or less than a predetermined value for a total time equal to or longer than a predetermined time is specified. The information of the personal attributes of the specified person is excluded from the map data after interpolation. The predetermined value is an example of a second threshold value.

(8) Method for Specifying Overlapping Person Between Map Data Items

In a case in which map data is interpolated, it is necessary to specify the overlapping person between the map data items. In this case, the overlapping person can be specified using the positional information of each person recorded on the map data. That is, it is possible to specify a disposition relationship (disposition pattern) between persons from the positional information of each person recorded on each map data item. Therefore, it is possible to specify the overlapping person from the disposition relationship. Similarly, the overlapping person can also be specified from the information of the personal attributes at each position. In other words, it is possible to specify the overlapping person from the pattern of the personal attributes.

In addition, even in a case in which the composite map data is generated, the overlapping person between the map data items can be specified to perform the combination process in units of map data. In other words, it is possible to perform the combination process, without using information such as the positions where the cameras are disposed.

(9) Heat Map

In the above-described embodiment, the heat map is generated using the seat chart of the event venue. However, the aspect of the heat map is not limited thereto. Any heat map may be used as long as the data of the audience at each position generated from the composite map data is displayed in color or color shading.

In addition, as the display aspect of the heat map, the entire heat map is not necessarily displayed. However, the heat map may be displayed for each area. Further, the heat map may be superimposed on the actual video and displayed.

(10) Configuration of Image Data Processing Device

In the image data processing device, a hardware structure of a processing unit performing various processes is implemented by various processors. The various processors include, for example, a CPU and/or a graphic processing unit (GPU) which is a general-purpose processor executing software to function as various processing units, a programmable logic device (PLD), such as a field programmable gate array (FPGA), which is a processor whose circuit configuration can be changed after manufacture, and a dedicated electric circuit, such as an application specific integrated circuit (ASIC), which is a processor having a dedicated circuit configuration designed to perform a specific process. A program is synonymous with software.

One processing unit may be configured by one of the various processors or a combination of two or more processors of the same type or different types. For example, one processing unit may be composed of a plurality of FPGAs or a combination of a CPU and an FPGA. In addition, a plurality of processing units may be configured by one processor. A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As described above, various processing units are configured using one or more of the various processors as a hardware structure.

EXPLANATION OF REFERENCES

1: image data processing system
2: event venue
3: performer
4: stage
6: seat
10: audience imaging device
100: image data processing device
101: CPU
103: ROM
104: HDD
105: operation unit
106: display unit
107: input/output interface
110: imaging control unit
120: map data processing unit
120A: imaging information acquisition unit
120B: face detection unit
120C: personal attribute recognition unit
120D: map generation unit
130: map data interpolation unit
140: map data combination unit
150: data processing unit
160: heat map generation unit
170: display control unit
180: output control unit
200: database
300: external device
C: camera
C1: first camera
C2: second camera
C3: third camera
C4: fourth camera
C5: fifth camera
C6: sixth camera
F: frame surrounding detected face
Im: image
P: audience
P29: audience
P34: audience
P47: audience
P55: audience
P62: audience
P84: audience
R1: imaging range of first camera R2: imaging range of second camera
R3: imaging range of third camera
R4: imaging range of fourth camera
R5: imaging range of fifth camera
R6: imaging range of sixth camera
V: viewing area
V1: area obtained by dividing viewing area
V2: area obtained by dividing viewing area
V3: area obtained by dividing viewing area
V4: area obtained by dividing viewing area
V5: area obtained by dividing viewing area
V6: area obtained by dividing viewing area
Vc: area obtained by dividing viewing area
W1: frame indicating imaging range
W2: frame indicating imaging range
W3: frame indicating imaging range
S1 to S10: image data processing procedure in image data processing system

What is claimed is:

1. An image data processing device that processes image data items which are obtained from a plurality of imaging devices and in which imaging ranges at least partially overlap, the image data processing device comprising a processor configured to perform:
   a process of detecting a face of a person in an image indicated by the image data and recognizing a personal attribute of the person on the basis of the detected face for each of the image data items;
   a process of generating map data, in which the recognized personal attribute has been recorded in association with a position of the person in the image indicated by the image data, for each of the image data items;
   a process of interpolating the personal attribute of the person who overlaps between a plurality of the map data items; and
   a process of combining the plurality of map data items after the interpolation to generate composite map data, wherein
   in a case in which information of the personal attribute is not capable of being interpolated with another map data item, the processor interpolates the information with another information item of the personal attribute having a similar change in attribute information over time.

2. The image data processing device according to claim 1, wherein the processor further performs a process of generating a heat map from the composite map data.

3. The image data processing device according to claim 2, wherein the processor further performs a process of displaying the generated heat map on a display.

4. The image data processing device according to claim 2, wherein the processor further performs a process of outputting the generated heat map to an outside.

5. The image data processing device according to claim 1, wherein the processor collates the personal attributes of the person who overlaps between the plurality of map data items and interpolates the personal attribute of the person lost in one map data item with the personal attribute of the person in another map data item.

6. The image data processing device according to claim 1, wherein the processor also calculates a recognition accuracy in a case in which the personal attribute of the person is recognized.

7. The image data processing device according to claim 6, wherein the processor replaces the personal attribute of the person with relatively low recognition accuracy with the personal attribute of the person with relatively high recognition accuracy to interpolate the personal attribute of the overlapping person.

8. The image data processing device according to claim 6, wherein the processor gives a weight corresponding to the recognition accuracy, calculates an average of the personal attributes of each of the persons, and replaces the personal attribute with the calculated average to interpolate the personal attribute of the overlapping person.

9. The image data processing device according to claim 6, wherein the processor has a plurality of recognition accuracies, adopts information of the personal attribute of the person having a recognition accuracy equal to or greater than a first threshold value, and interpolates the personal attribute of the overlapping person.

10. The image data processing device according to claim 6, wherein the processor further performs a process of excluding information of the personal attribute having a recognition accuracy equal to or less than a second threshold value in the map data after interpolation.

11. The image data processing device according to claim 1, wherein the processor further performs a process of specifying the person who overlaps between the plurality of map data items.

12. The image data processing device according to claim 11, wherein the processor specifies the person who overlaps between the plurality of map data items on the basis of a disposition relationship of the person in the map data.

13. The image data processing device according to claim 11, wherein the processor specifies the person who overlaps between the plurality of map data items on the basis of the personal attribute of the person at each position in the map data.

14. The image data processing device according to claim 1, wherein the processor recognizes at least one of gender, age, or emotion as the personal attribute on the basis of the face of the person.

15. The image data processing device according to claim 1, wherein the processor instructs the plurality of imaging devices to image an area, in which the imaging ranges overlap each other, under different conditions.

16. The image data processing device according to claim 15, wherein the processor instructs the plurality of imaging devices to image the area, in which the imaging ranges overlap each other, in different directions.

17. The image data processing device according to claim 15, wherein the processor instructs the plurality of imaging devices to image the area, in which the imaging ranges overlap each other, with different exposures.

18. An image data processing system comprising:
a plurality of imaging devices whose imaging ranges at least partially overlap; and
an image data processing device that processes image data items obtained from the plurality of imaging devices,
wherein the image data processing device includes
a processor configured to perform:
   a process of detecting a face of a person in an image indicated by the image data and recognizing a personal attribute of the person on the basis of the detected face for each of the image data items;

a process of generating map data, in which the recognized personal attribute has been recorded in association with a position of the person in the image indicated by the image data, for each of the image data items;

a process of interpolating the personal attribute of the person who overlaps between a plurality of the map data items; and a process of combining the plurality of map data items after the interpolation to generate composite map data, and in a case in which information of the personal attribute is not capable of being interpolated with another map data item, the processor interpolates the information with another information item of the personal attribute having a similar change in attribute information over time.

19. The image data processing system according to claim 18, wherein the plurality of imaging devices image an area, in which imaging ranges overlap each other, under different conditions.

20. The image data processing system according to claim 19, wherein the plurality of imaging devices image the area, in which the imaging ranges overlap each other, in different directions.

21. The image data processing system according to claim 19, wherein the plurality of imaging devices image the area, in which the imaging ranges overlap each other, with different exposures.

* * * * *